United States Patent
Nagase et al.

(10) Patent No.: US 9,578,286 B2
(45) Date of Patent: Feb. 21, 2017

(54) COMMUNICATION MANAGEMENT SYSTEM, COMMUNICATION TERMINAL, COMMUNICATION SYSTEM, COMMUNICATION CONTROL METHOD, AND RECORDING MEDIUM

(71) Applicants: Tatsuya Nagase, Kanagawa (JP); Yuya Akimoto, Tokyo (JP)

(72) Inventors: Tatsuya Nagase, Kanagawa (JP); Yuya Akimoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/968,036

(22) Filed: Dec. 14, 2015

(65) Prior Publication Data

US 2016/0191851 A1 Jun. 30, 2016

(30) Foreign Application Priority Data

Dec. 26, 2014 (JP) ................. 2014-265127

(51) Int. Cl.
*H04N 7/14* (2006.01)
*H04N 7/15* (2006.01)
(Continued)

(52) U.S. Cl.
CPC ............... *H04N 7/15* (2013.01); *H04N 7/147* (2013.01); *H04N 7/148* (2013.01); *H04W 8/22* (2013.01);
(Continued)

(58) Field of Classification Search
USPC ............ 348/14.08, 14.09, 14.12, 14.04, 156, 348/14.01, 14.03, 208.13, 333.11, 348/E13.017
See application file for complete search history.

(56) References Cited

U.S. PATENT DOCUMENTS 7,136,448 B1 * 11/2006 Venkataperumal . H04M 3/5166
379/265.02
7,680,141 B2 * 3/2010 Miyake ................. H04L 1/0002
370/235
(Continued)

FOREIGN PATENT DOCUMENTS

EP 2 030 403 A1 3/2009
JP 2008-227577 9/2008
WO WO2004/001602 A1 12/2003

OTHER PUBLICATIONS

Extended European Search Report issued on May 3, 2016 in Patent Application No. 15200380.2.

*Primary Examiner* — Yosef K Laekemariam
(74) *Attorney, Agent, or Firm* — Oblon, McClelland, Maier & Neustadt, L.L.P.

(57) ABSTRACT

A communication management system transmits a request for obtaining capability information indicating capability of a first communication terminal of a plurality of communication terminals, to the first communication terminal through a network, receives capability information of the first communication terminal from the first communication terminal, determines a set value for each one of a plurality of set items to be configured in providing a service plan corresponding to the capability of the first communication terminal, based on the capability information of the first communication terminal, and transmits the determined set value of each one of the plurality of set items to a relay device, as an operating parameter for controlling the relay device in transmitting or receiving content data to or from the first communication terminal according the service plan corresponding to the capability of the first communication terminal.

14 Claims, 26 Drawing Sheets

(51) Int. Cl.
*H04W 8/22* (2009.01)
*H04W 8/24* (2009.01)
H04W 4/18 (2009.01)
H04W 8/18 (2009.01)

(52) U.S. Cl.
CPC ............... *H04W 8/24* (2013.01); *H04W 4/18* (2013.01); *H04W 8/18* (2013.01)

(56) References Cited

U.S. PATENT DOCUMENTS

| | | | |
|---|---|---|---|
| 7,873,384 B2 * | 1/2011 | Karaoguz | H04L 41/0843 455/552.1 |
| 2008/0233944 A1 | 9/2008 | Tu | |
| 2014/0082416 A1 | 3/2014 | Mishra et al. | |

* cited by examiner

SERVICE PLAN MANAGEMENT TABLE

| SET ITEM / SESSION ID | FRAME RATE (fps) | RESOLUTION | BIT RATE (kbps) | ENCODING FORMAT | TERMINAL IP ADDRESS |
|---|---|---|---|---|---|
| se1 | 30 | VGA | 1024 | H.264/SVC | 1.2.1.3, 1.3.2.4 |
| se2 | 10 | HD | 256 | H.264/AVC | 1.2.1.4, 1.2.2.5 |
| se3 | 30 | 8K | 1024 | H.264/SVC | 1.2.2.4, 1.3.1.3 |
| ... | ... | ... | ... | ... | ... |

FIG. 10

RELAY DEVICE MANAGEMENT TABLE

| RELAY DEVICE ID | OPERATING STATE | DATE/TIME RECEIVED | IP ADDRESS OF RELAY DEVICE | MAXIMUM DATA TRANSFER RATE (Mbps) |
|---|---|---|---|---|
| 111a | ONLINE | 2014.4.10.13:00 | 1.2.1.2 | 100 |
| 111b | OFFLINE | 2014.4.10.13:10 | 1.2.2.2 | 1000 |
| 111c | ONLINE | 2014.4.10.13:20 | 1.3.1.2 | 100 |
| 111d | ONLINE | 2014.4.10.13:30 | 1.3.2.2 | 10 |

FIG. 11

AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 12

TERMINAL MANAGEMENT TABLE

| TERMINAL ID | COUNTERPART TERMINAL NAME | OPERATING STATE | DATE/TIME RECEIVED | IP ADDRESS OF TERMINAL | SERVICE PLAN ID |
|---|---|---|---|---|---|
| 01aa | AA TERMINAL, TOKYO OFFICE, JAPAN | ONLINE (COMMUNICATION OK) | 2014.4.10.13:40 | 1.2.1.3 | sv103 |
| 01ab | AB TERMINAL, OSAKA OFFICE, JAPAN | OFFLINE | 2014.4.09.12:00 | 1.2.1.4 | sv201 |
| ... | ... | ... | ... | ... | ... |
| 01ba | BA TERMINAL, BEIJINIG OFFICE, CHINA | ONLINE (COMMUNICATION OK) | 2014.4.10.13:45 | 1.2.2.3 | sv101 |
| 01bb | BB TERMINAL, SHANGHAI OFFICE, CHINA | ONLINE (INTERRUPTED) | 2014.4.10.13:50 | 1.2.2.4 | sv103 |
| ... | ... | ... | ... | ... | ... |
| 01ca | CA TERMINAL, WASHINGTON D.C. OFFICE, U.S. | OFFLINE | 2014.4.10.12:45 | 1.3.1.3 | sv101 |
| 01cb | CB TERMINAL, NEW YORK OFFICE, U.S. | ONLINE (COMMUNICATING) | 2014.4.10.13:55 | 1.3.1.4 | sv103 |
| ... | ... | ... | ... | ... | ... |
| 01da | DA TERMINAL, BERLIN OFFICE, EUROPE | ONLINE (COMMUNICATING) | 2014.4.08.12:45 | 1.3.2.3 | sv1201 |
| 01db | DB TERMINAL, LONDON OFFICE, EUROPE | ONLINE (COMMUNICATION OK) | 2014.4.10.12:45 | 1.3.2.4 | sv203 |
| ... | ... | ... | ... | ... | ... |

FIG. 13

CANDIDATE LIST MANAGEMENT TABLE

| TERMINAL ID OF STARTING TERMINAL | TERMINAL ID OF COUNTERPART TERMINAL |
|---|---|
| 01aa | 01ab, ···, 01ba, 01bb, ···, 01ca, 01cb, 01da, 01db, ··· |
| 01ab | 01aa, 01ca, 01cb |
| 01ba | 01aa, 01ab, 01ca, 01cb, 01da, 01db |
| ··· | ··· |
| 01db | 01aa, 01ab, 01ba, ···, 01da, 01ca, 01cb, ···, 01da |

FIG. 14

SESSION MANAGEMENT TABLE

| SELECTION SESSION ID | RELAY DEVICE ID | TERMINAL ID OF STARTING TERMINAL | TERMINAL ID OF COUNTERPART TERMINAL | DELAY TIME (ms) | DELAY INFORMATION DATE/TIME RECEIVED |
|---|---|---|---|---|---|
| se1 | 111d | 01aa | 01db | 200 | 2014.4.10.14:00 |
| se2 | 111c | 01ca | 01cb | 100 | 2014.4.10.14:10 |
| se3 | 111a | 01ab | 01ac | 50 | 2014.4.10.14:20 |
| ... | | | | | |

FIG. 15

CAPABILITY MANAGEMENT TABLE

| CAPABILITY ID | CAPABILITY NAME |
|---|---|
| m001 | LINE SPEED |
| m002 | DISPLAY RESOLUTION |
| ... | ... |

FIG. 16A

PREFERRENTIAL RATING MANAGEMENT TABLE

CAPABILITY ID: m001

| SET VALUE ID \ CAPABILITY LEVEL | 0-500 (kbps) | 501-1000 (kbps) | 1001- (kbps) |
|---|---|---|---|
| svc101 | 10 | 0 | 0 |
| svc102 | 0 | 10 | 0 |
| svc103 | 0 | 0 | 10 |
| ... | ... | ... | ... |
| svc201 | 10 | 0 | 0 |
| svc202 | 0 | 10 | 0 |
| svc203 | 0 | 0 | 5 |
| ... | ... | ... | ... |

FIG. 16B

PREFERRENTIAL RATING MANAGEMENT TABLE

CAPABILITY ID: m002

| SET VALUE ID \ CAPABILITY LEVEL | VGA | SD | HD | ... |
|---|---|---|---|---|
| svc201 | 10 | 0 | 0 | ... |
| svc202 | 0 | 5 | 0 | ... |
| svc203 | 0 | 0 | 5 | ... |
| ... | ... | ... | ... | ... |

FIG. 17A

| SERVICE ID: sv100 (FRAME RATE) | |
|---|---|
| SET VALUE ID | SET VALUE |
| svc101 | 10 (fps) |
| svc102 | 20 (fps) |
| svc103 | 30 (fps) |
| ... | ... |

FIG. 17B

| SERVICE ID: sv200 (RESOLUTION) | |
|---|---|
| SET VALUE ID | SET VALUE |
| svc201 | VGA |
| svc202 | SD |
| svc203 | HD |
| ... | ... |

FIG. 18

SERVICE PLAN MANAGEMENT TABLE

| SET ITEM / SERVICE PLAN ID | FRAME RATE (fps) | RESOLUTION | BIT RATE (kbps) | ENCODING FORMAT | USAGE FEE (Yen/Month) |
|---|---|---|---|---|---|
| svp101 | 30 | VGA | 1024 | H.264/SVC | 15,000 |
| svp102 | 20 | SD | 205 | H.264/SVC | 10,000 |
| svp103 | 10 | SD | 64 | MPEG-2 | 5,000 |
| ... | ... | ... | ... | ... | ... |
| svp201 | 30 | 8K | 1024 | H.264/SVC | 40,000 |
| svp202 | 20 | 4K | 512 | H.264/SVC | 20,000 |
| svp203 | 10 | HD | 256 | H.264/AVC | 10,000 |
| ... | ... | ... | ... | ... | ... |

FIG. 22

DETERMINE SERVICE PLAN TO BE RECOMMENDED

Do you want to search for recommended service plan?

| YES | NO |

FIG. 24A

| SERVICE ID: sv100 | |
|---|---|
| SET VALUE ID | TOTAL PREFERRENTIAL RATING |
| svc101 | 0 |
| svc102 | 0 |
| svc103 | 0 |
| ... | ... |

FIG. 24B

| SERVICE ID: sv100 | |
|---|---|
| SET VALUE ID | TOTAL PREFERRENTIAL RATING |
| svc101 | 0 |
| svc102 | 0 |
| svc103 | 10 |
| ... | ... |

FIG. 25A

| SERVICE ID: sv200 | |
|---|---|
| SET VALUE ID | TOTAL PREFERRENTIAL RATING |
| svc201 | 0 |
| svc202 | 0 |
| svc203 | 0 |
| ... | ... |

FIG. 25B

| SERVICE ID: sv200 | |
|---|---|
| SET VALUE ID | TOTAL PREFERRENTIAL RATING |
| svc201 | 0 |
| svc202 | 0 |
| svc203 | 5 |
| ... | ... |

FIG. 25C

| SERVICE ID: sv200 | |
|---|---|
| SET VALUE ID | TOTAL PREFERRENTIAL RATING |
| svc201 | 10 |
| svc202 | 0 |
| svc203 | 5 |
| ... | ... |

COMMUNICATION MANAGEMENT SYSTEM, COMMUNICATION TERMINAL, COMMUNICATION SYSTEM, COMMUNICATION CONTROL METHOD, AND RECORDING MEDIUM

CROSS-REFERENCE TO RELATED APPLICATIONS

This patent application is based on and claims priority pursuant to 35 U.S.C. §119(a) to Japanese Patent Application No. 2014-265127, filed on Dec. 26, 2014, in the Japan Patent Office, the entire disclosure of which is hereby incorporated by reference herein.

BACKGROUND

Technical Field

The present invention generally relates to managing a plurality of communication terminals that transmit or receive content data.

Description of the Related Art

An example of a communication system that transmits or receives content data between a plurality of communication terminals via a relay device includes a videoconference system that carries out videoconference via a communication network such as the Internet. There is an increasing need for such videoconference systems due to reduction in business trip costs and time in recent years. In such videoconference systems, a plurality of videoconference terminals, which are examples of communication terminals, is used. A videoconference can be carried out by transmission or reception of image data and sound data between these videoconference terminals.

The recent improvement of broadband circumstances contributes to transmission and reception of high-quality image data and high-quality sound data. Accordingly, it becomes easier to detect the circumstances of a communication partner in a videoconference, thus improving productivity of conversation-based communication.

The same communication terminal (or of the same type) may be used for different applications or purposes. For example, in the case of using a communication terminal for remote diagnosis system, an image of the affected part of a patient needs to be sent to a remote place. It is thus preferable that image data be of high quality. In contrast, in the case of using a communication terminal for a videoconference system for merely conveying a message, image data may be of low quality.

However, there is a general tendency that the higher the quality of image data and sound data, the more expensive the usage fee of a communication system. Therefore, in the case of using the same communication terminal (or of the same type) for different applications or purposes, if the user is unable to select a communication quality that suits a particular application or purpose, the user may eventually pay a wasteful usage fee.

SUMMARY

Example embodiments of the present invention include a communication management system, which transmits a request for obtaining capability information indicating capability of a first communication terminal of a plurality of communication terminals, to the first communication terminal through a network, receives capability information of the first communication terminal from the first communication terminal, determines a set value for each one of a plurality of set items to be configured in providing a service plan corresponding to the capability of the first communication terminal, based on the capability information of the first communication terminal, and transmits the determined set value of each one of the plurality of set items to a relay device, as an operating parameter for controlling the relay device in transmitting or receiving content data to or from the first communication terminal according the service plan corresponding to the capability of the first communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is an illustration of an example data structure of a relay device management table;

FIG. 11 is an illustration of an example data structure of an authentication management table;

FIG. 12 is an illustration of an example data structure of a terminal management table;

FIG. 13 is an illustration of an example data structure of a candidate list management table;

FIG. 14 is an illustration of an example data structure of a session management table;

FIG. 15 is an illustration of an example data structure of a capability management table;

FIG. 16A is an illustration of an example data structure of a preferential rating management table for line speed;

FIG. 16B is an illustration of an example data structure of a preferential rating management table for display resolution;

FIG. 17A is an illustration of an example data structure of a set value management table for frame rate;

FIG. 17B is an illustration of an example data structure of a set value management table for display resolution;

FIG. 18 is an illustration of an example data structure of a service plan management table;

FIG. 22 is an illustration of an example screen, which allows a user to request for configuring a service plan;

FIGS. 24A and 24B (FIG. 24) are a schematic diagram for explaining calculating total preferential rating for frame rate;

FIGS. 25A, 25B, and 25C (FIG. 25) are a schematic diagram for explaining calculating total preferential rating for display resolution;

Figure 1:
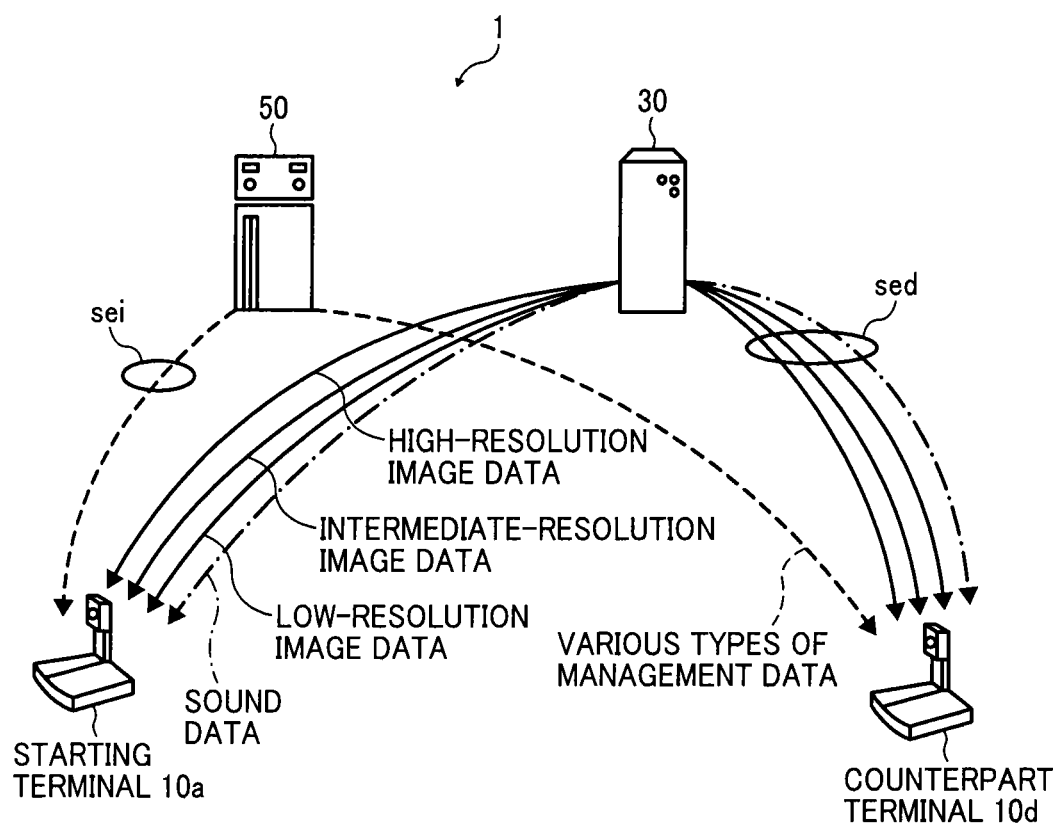
FIG. 1 is a schematic diagram illustrating a part of a communication system relating to videoconference communication, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring to the drawings, an embodiment of the present invention is described.

<Configuration of Videoconference System>

Referring to FIG. 1, a communication system 1 for carrying out videoconference among a plurality of communication terminals (10a, 10d) is described according to the embodiment. FIG. 1 is a schematic diagram illustrating a portion of the communication system 1, which relates to videoconference being carried out between the communication terminals 10a and 10d.

The communication system 1 includes the plurality of communication terminals (10a, 10d), a relay device 30, and a communication management system 50. In the following, any arbitrary one or ones of the plurality of communication terminals (10a, 10d) is or are referred to as the communication terminal 10.

The communication terminal 10 transmits or receives image data and sound data as an example of content data. The image data may be a video image or a still image, or both of the video image and the still image.

In this disclosure, the communication terminal that sends a request for starting videoconference is referred to as the "starting terminal", and the communication terminal serving as a request destination (relay destination) of videoconference is referred to as the "counterpart terminal". In FIG. 1, the communication terminal 10a is referred to as the starting terminal, and the communication terminal 10d is referred to as the counterpart terminal. Alternatively, when the communication terminal 10d requests to start videoconference with the communication terminal 10a, the communication terminal 10d is referred to as the starting terminal, and the communication terminal 10a is referred to as the counterpart terminal. Note that the communication terminal 10 may be used not only for communication between different offices or for communication between different rooms in the same office, but also for communication within the same room or for outdoor-indoor communication or outdoor-outdoor communication. In the case where the communication terminal 10 is used outside, wireless communication using a mobile phone communication network or the like is performed.

The relay device 30 relays content data among the plurality of communication terminals 10. The communication management system 50 centrally controls login authentication of the communication terminal 10, management of the communication state of the communication terminal 10, management of a candidate list or the like, and management of the communication state or the like of the relay device 30.

In the communication system 1, a management data session "sei" is established between the starting terminal 10 and the counterpart terminal 10 via the communication management system 50 to transmit or receive various management data. Between the starting terminal 10 and the counterpart terminal 10, four sessions are established via the relay device 30 to transmit or receive four items of data including high-resolution image data, intermediate-resolution image data, low-resolution image data, and sound data. In FIG. 1, these four sessions are collectively referred to as image and sound data session "sed". The image and sound data session "sed" may not always include four sessions, but any number of sessions greater than or less than four.

Now, resolution of image data to be processed in this embodiment is described. The low-resolution image data serves as a base image and has horizontal 160 pixels by vertical 120 pixels. The intermediate-resolution image data has horizontal 320 pixels by vertical 240 pixels. The high-resolution image data has horizontal 640 pixels by vertical 480 pixels. In the case of a narrow band path, low-quality image data that only includes low-resolution image data serving as a base image is relayed. In the case of a relatively wide band path, intermediate-quality image data including low-resolution image data serving as a base image and intermediate-resolution image data is relayed. In the case of a very wide band path, high-quality image data including low-resolution image data serving as a base image, intermediate-resolution image data, and high-resolution image data is relayed. Since sound data is relatively small in data size, the sound data is relayed even in the case of a narrow band path.

Examples of the communication system 1 include a data providing system that performs one-way transmission of content data from one communication terminal to another communication terminal via a communication management system, and a communication system that intercommunicates information, information reflecting feelings, or the like between a plurality of communication terminals via a communication management system. The communication system is a system for intercommunicating information, information reflecting feelings, or the like between a plurality of communication terminals via a communication management system, and examples thereof include a teleconference system and a videoconference system.

In this embodiment, the communication system, the communication management system, and the communication terminal will be described while assuming a videoconference system serving as an example of the communication system, a videoconference management system serving as an example of the communication management system, and a videoconference terminal serving as an example of the communication terminal. That is, the communication terminal and the communication management system according to the embodiment of the present invention are applied not only to a videoconference system, but also to any desired communication system.

<Hardware Configuration of Communication System>

Figure 2:
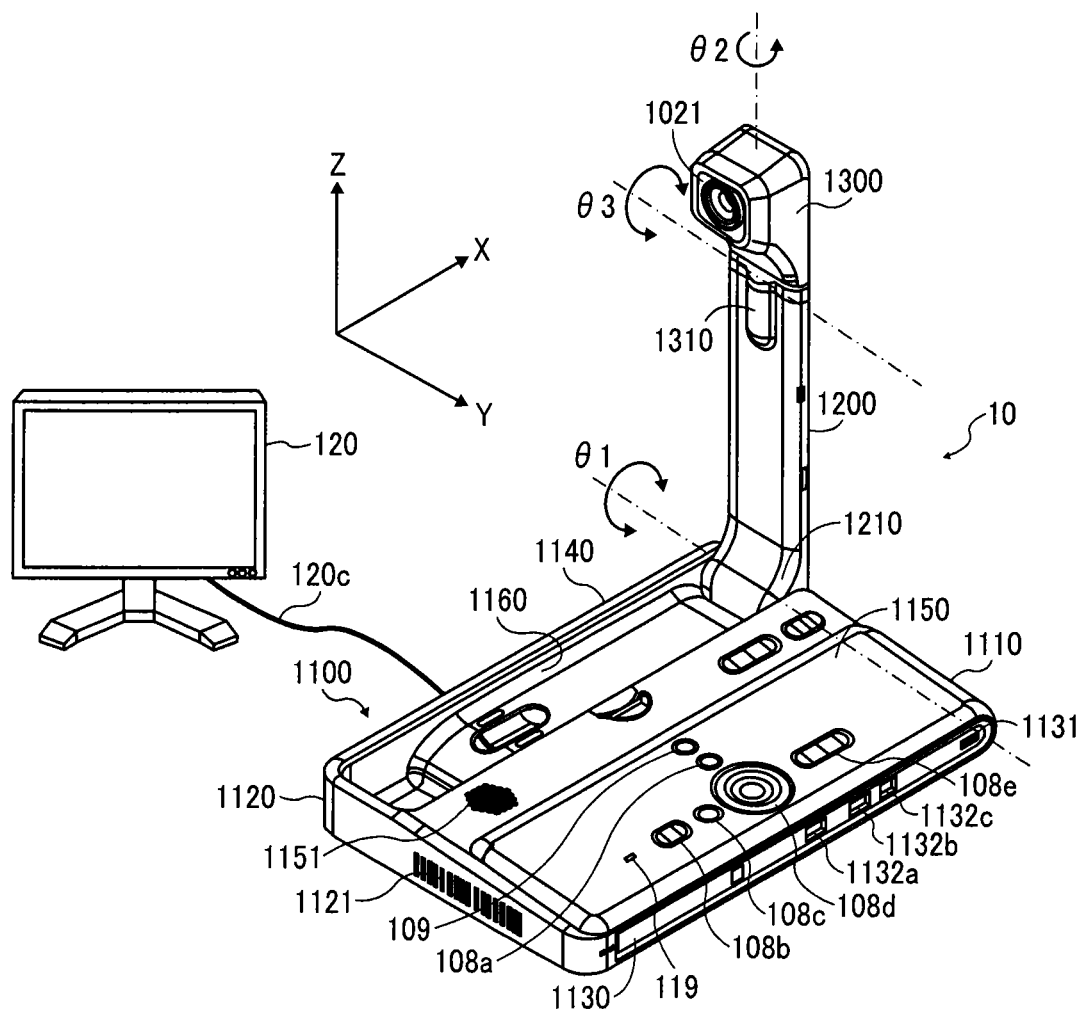
FIG. 2 is a perspective view illustrating an outer appearance of a communication terminal of the communication system of FIG. 1.

Now, a hardware configuration of the communication system 1 is described. FIG. 2 is a perspective view illustrating an outer appearance of the communication terminal 10 of the communication system 1 of FIG. 1. As illustrated in FIG. 2, the communication terminal 10 includes a casing 1100, an arm 1200, and a camera housing 1300. The casing 1100 has a front wall 1110 provided with an inlet face including a plurality of inlet holes, and a back wall 1120 having an exhaust face 1121 on which a plurality of exhaust holes is formed. As a cooling fan included in the casing 1100 is driven, air behind the communication terminal 10 can be taken in via the inlet face and exhausted to the rear of the communication terminal 10 via the exhaust face 1121. A right-side wall 1130 of the casing 1100 has a sound pickup hole 1131 formed thereon, and a built-in microphone 114, described later, is capable of picking up sound such as sound, noise, or vibration.

An operation panel 1150 is formed toward the right-side wall 1130 of the casing 1100. The operation panel 1150 includes a plurality of operation keys 108a to 108e, a power switch 109, and a plurality of sound output holes 1151. Through the sound output holes 1151, a speaker 115 of the terminal 10 is able to output sounds such as sounds generated based on human voice. The casing 1100 further includes a holder 1160, which is provided at the front surface toward the left side wall 1140. The holder 1160, which has a concave shape, accommodates therein the arm 1200 and the camera housing 1300. A plurality of connection ports (1132a to 1132c) for electrically connecting cables to an external device connection interface (I/F) 118 described later is provided on the right-side wall 1130 of the casing 1100. In contrast, a connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

The arm 1200 is attached to the casing 1100 via a torque hinge 1210 so as to be rotatable in the vertical direction within the range of a tilt angle θ1 of 135 degrees with respect to the casing 1100. FIG. 2 illustrates a state in which the tilt angle θ1 is 90 degrees. The camera housing 1300 incorporates therein the camera 112 that takes an image of an object. The object may be a part of a user, document, or a room where the terminal 10 is located. The camera housing 1300 is provided with a torque hinge 1310. With the torque hinge, the camera housing 1300 is attached to the arm 1200. The camera housing 1300 is made rotatable in the vertical and horizontal directions within the range of a pan angle θ2 of ±180 degrees and a tilt angle θ3 of ±45 degrees with respect to the arm 1200, in which the state illustrated in FIG. 2 serves as 0 degrees.

Note that the external view illustrated in FIG. 2 is only exemplary and the appearance is not restricted thereto. The camera 112 and the microphone 114 need not necessarily be built-in devices and may be external devices. Since the communication management system 50 has the same appearance as that of a general server computer, a description of the appearance thereof is omitted.

Figure 3:
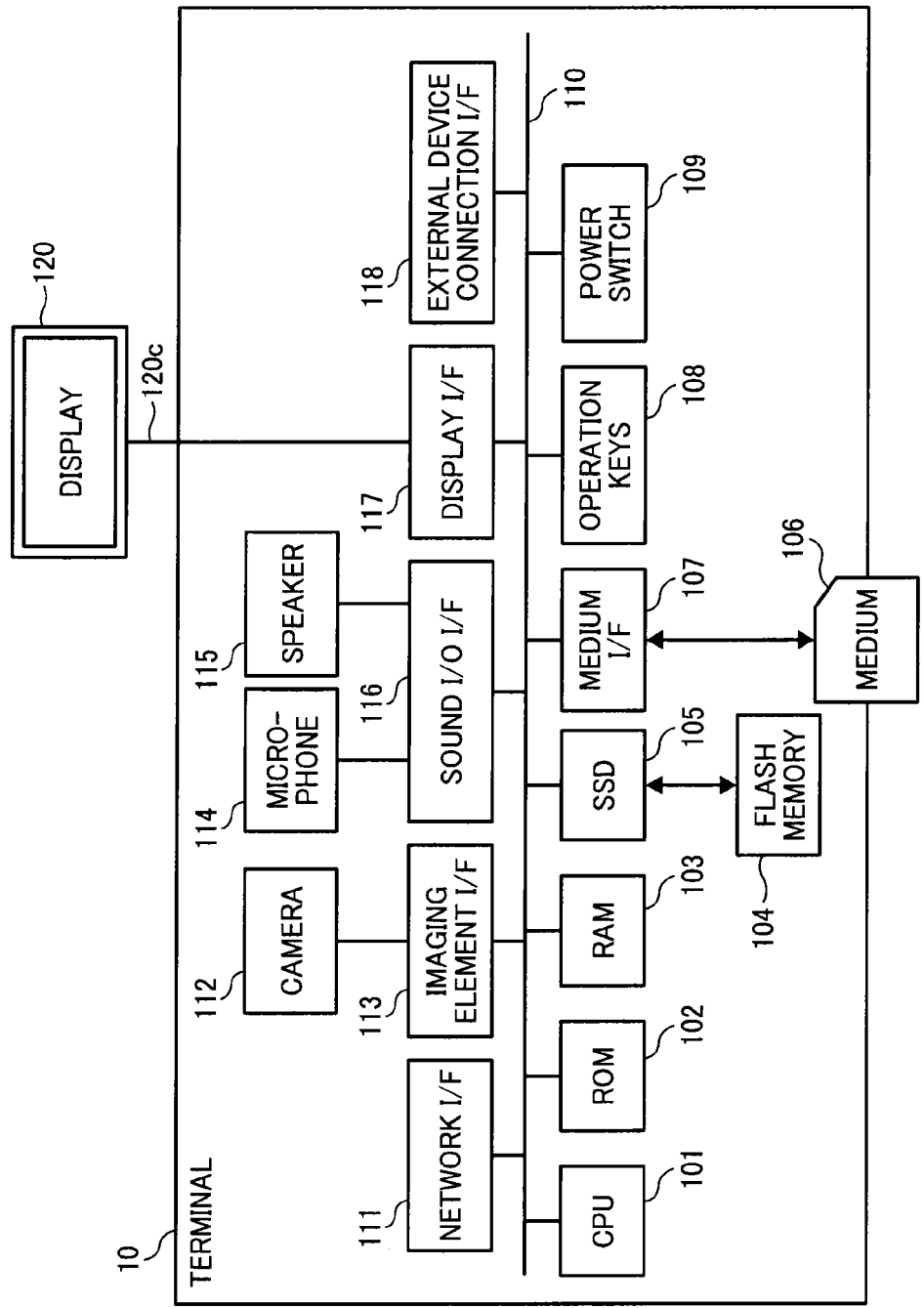
FIG. 3 is a schematic block diagram illustrating a hardware configuration of the communication terminal of FIG. 2.

FIG. 3 is a schematic block diagram illustrating a hardware configuration of the communication terminal 10. As illustrated in FIG. 3, the communication terminal 10 of the embodiment includes a central processing unit (CPU) 101 that controls entire operation of the communication terminal 10, a read only memory (ROM) 102 that stores a program for operating the CPU 101 such as an initial program loader (IPL), a random access memory (RAM) 103 that operates as a work area for the CPU 101, a flash memory 104 that stores various types of data, such as the terminal control program, image data, and sound data, a solid state drive (SSD) 105 that controls reading/writing of various types of data from/to the flash memory 104 under control of the CPU 101, a medium I/F 107 that controls reading/writing (storage) of data from/to a recording medium 106, the operation key 108 operated in the case of, for example, selecting a counterpart terminal of the communication terminal 10, the power switch 109 for turning on/off the power of the communication terminal 10, and a network interface (I/F) 111 for transmitting data using the communication network 2. In alternative to the SSD, a hard disk drive (HDD) may be used.

In addition, the communication terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sounds, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 for connecting various external devices, and a bus line 110 such as an address bus and a data bus for electrically connecting the above-described elements as illustrated in FIG. 3.

The display 120 is a display formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the communication terminal 10. In addition, a non-volatile memory that reads or writes data under control of the CPU 101 is not limited to the flash memory 104, and an electrically erasable and programmable read-only memory (EEPROM) may be used instead.

Further, the terminal control program may be recorded in a file in a format installable or executable on a computer-readable recording medium such as the recording medium 106 for distribution. In addition, the terminal control program may be stored on the ROM 102, instead of the flash memory 104.

Figure 4:
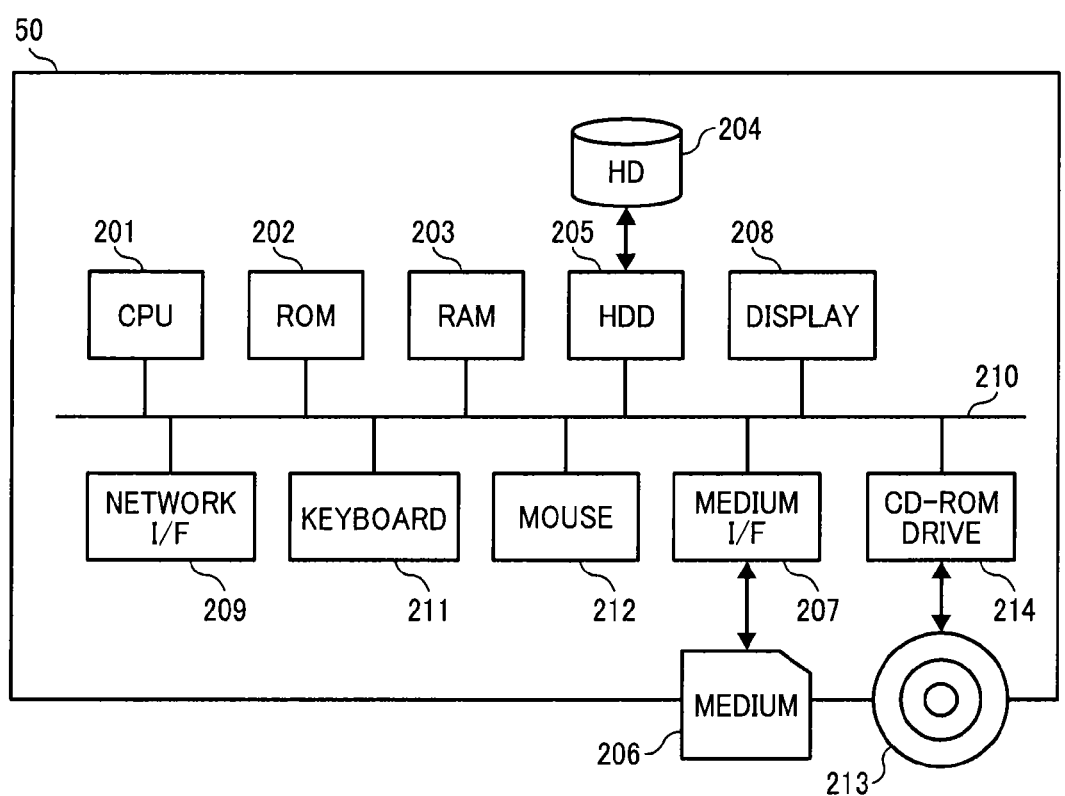
FIG. 4 is a schematic block diagram illustrating a hardware configuration of a communication management system of the communication system of FIG. 1.

FIG. 4 is a diagram illustrating a hardware configuration of the communication management system 50 according to the embodiment.

Figure 6:
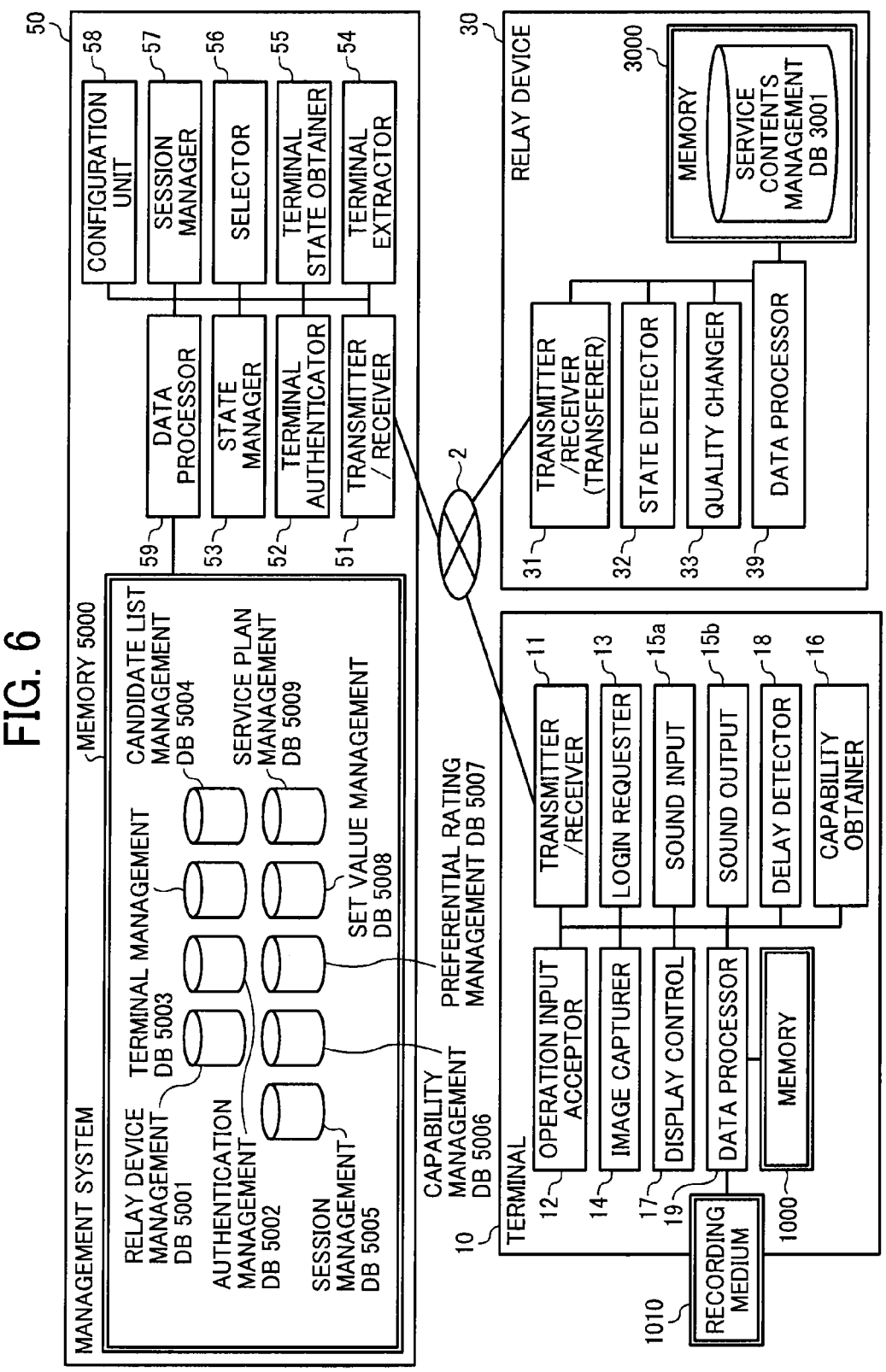
FIG. 6 is a schematic block diagram illustrating a functional configuration of the terminal, device, and system in the communication system of FIG. 1 according to the embodiment.

The communication management system 50 includes a CPU 201 that controls entire operation of the communication management system 50, a ROM 202 that stores a program for operating the CPU 201, such as an IPL, a RAM 203 used as a work area for the CPU 201, the HD 204, which stores various types of data, such as the communication management program, a hard disk drive (HDD) 205 that controls reading/writing of various types of data from/to the HD 204 under control of the CPU 201, a medium I/F 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements, as illustrated in FIG. 6.

Note that the communication management program may be recorded in a file in a format installable or executable on a computer-readable recording medium such as the recording medium 206 or the CD-ROM 213 for distribution. In addition, the communication management program may be stored on the ROM 202, instead of the HD 204.

Other examples of the removable recording medium include a computer-readable recording medium such as a compact disc recordable (CD-R), a digital versatile disk (DVD), and a Blue-ray disk.

Since the relay device 30 has a hardware configuration that is the same as or similar to that of the above-described communication management system 50, descriptions thereof are omitted. In case of the relay device 30, the HD 204 stores a relay device control program in alternative to the communication management program.

<Configuration of Communication System>

Figure 5:
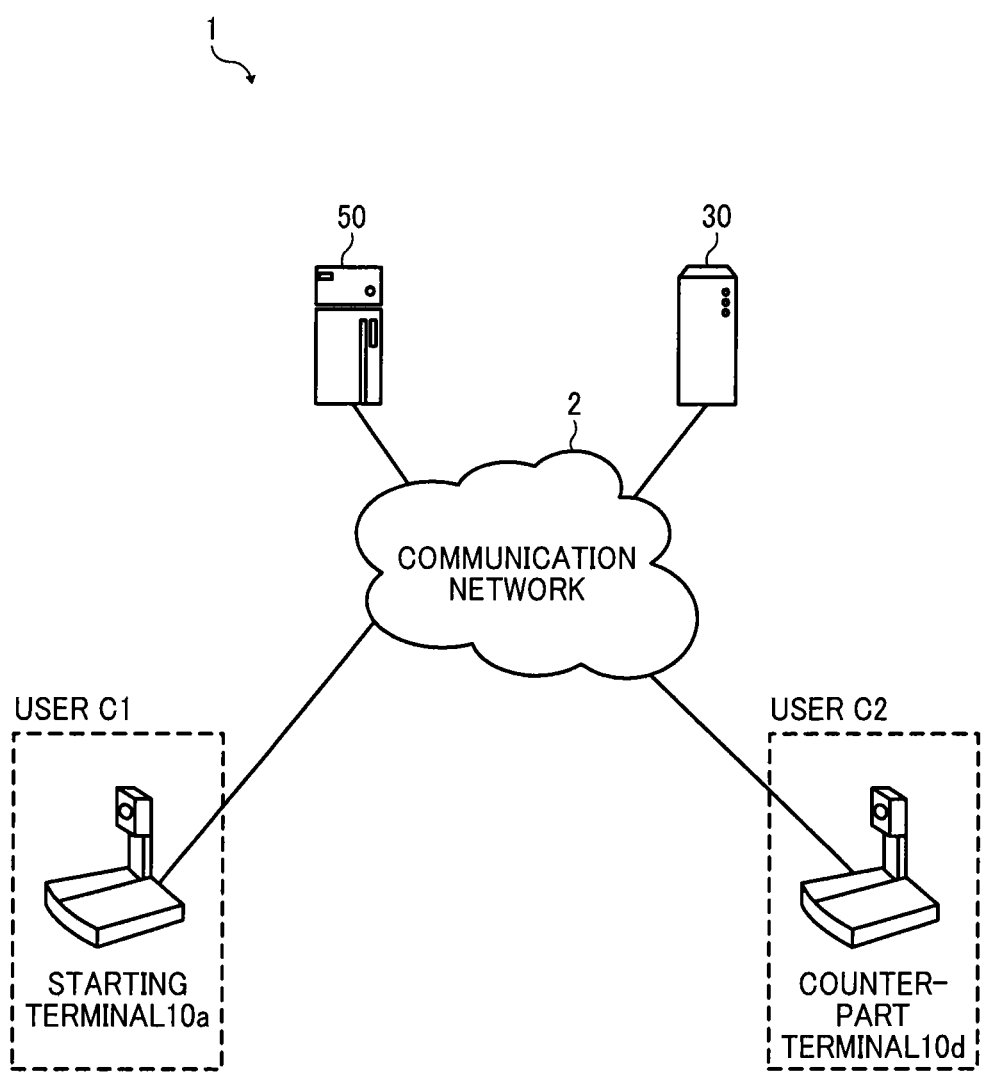
FIG. 5 is a schematic diagram illustrating the communication system of FIG. 1.

Referring now to FIG. 5, a configuration of the communication system 1 is described according to the embodiment. FIG. 5 is a schematic diagram illustrating the communication system 1 of FIG. 1.

In FIG. 5, the starting terminal 10a, the counterpart terminal 10d, the relay device 30, and the communication management system 50 are connected to the communication network 2 including the Internet. The communication network 2 may include wireless network, in addition to wired network. The communication terminal 10a is operated by a user C1, and the communication terminal 10d is operated by a user C2. The communication management system 50 provides the communication terminal 10 with various services as described below.

<Functional Configuration of Terminal>

The terminal 10 includes a transmitter/receiver 11, an operation input acceptor 12, a login requester 13, an image capturer 14, a sound input 15a, a sound output 15b, a capability obtainer 16, a display control 17, a delay detector 18, and a data processor 19. These units are functions that are implemented by or that are caused to function by operating any of the hardware components illustrated in FIG. 3 in cooperation with the instructions of the CPU 101 according to the terminal program expanded from the flash memory 104 to the RAM 103. The terminal 10 further includes a memory 1000 implemented by the RAM 103 illustrated in FIG. 3, and the flash memory 104 illustrated in FIG. 3. The terminal 10 is inserted with a recording medium 1010, which is implemented by the recording medium 106 illustrated in FIG. 3. The data processor 19 reads or writes various data from or to the recording medium 1010.

Referring to FIGS. 3 and 6, a functional configuration of the terminal 10 is explained in detail. In the following description of functional configuration of the terminal 10, relationships of the hardware components in FIG. 3 with the functional configuration of the terminal 10 in FIG. 6 will also be described.

The transmitter/receiver 11 of the terminal 10 illustrated in FIG. 6, which may be implemented by the instructions of the CPU 101 of FIG. 3, and the network I/F 111 of FIG. 3, transmits or receives various data (or information) to the other terminal, device, or system through the communication network 2. Before starting communication with a desired counterpart terminal, the transmitter/receiver 11 starts receiving state information indicating the state of each candidate counterpart terminal, from the management system 50. The state information not only indicates the operating state of each terminal 10 (whether the terminal 10 is online or offline), but also indicates a detailed state such as whether the terminal 10 whose state is online is now capable of communicating or is currently communicating, or the user of the terminal 10 is not at the terminal 10. In addition, the state information not only indicates the operating state of each terminal 10, but also indicates various states, such as the state that the cable 120c is disconnected from the terminal 10, the state that the terminal 10 can output sounds but not images, or the state that the terminal 10 is muted. Hereinafter, the case in which the state information indicates the operating state will be described by way of example.

The operation input acceptor 12, which is implemented by the instructions of the CPU 101 illustrated in FIG. 3 and by the operation keys 108 and the power switch 109 illustrated in FIG. 3, accepts various inputs from the user. For example, when the user turns on the power switch 109 illustrated in FIG. 3, the operation input acceptor 12 illustrated in FIG. 6 accepts the power on operation and turns on the power.

The login requester 13 is implemented by the instructions of the CPU 101 illustrated in FIG. 3. In response to the power on operation, the login requester 13 causes the transmitter/receiver 11 to automatically transmit to the management system 50 via the communication network 2, login request information indicating a login request, and the current IP address of the starting terminal. In addition, when the user turns the power switch 109 from on to off, the transmitter/receiver 11 transmits to the management system 50 state information indicating that the power is to be turned off, and then the operation input acceptor 12 completely turns off the power. Accordingly, the management system 50 can detect that the power of the terminal 10 is turned from on to off.

The image capturer 14 is implemented by the instructions of the CPU 101 illustrated in FIG. 3 and by the camera 112 and the imaging element I/F 113 illustrated in FIG. 3. The image capturer 14 captures an image of a subject and outputs image data obtained by capturing the image.

The sound input 15a is implemented by the instructions of the CPU 101 illustrated in FIG. 3 and by the sound input/output I/F 116 illustrated in FIG. 3. After the sound of the user is converted to a sound signal by the microphone 114, the sound input 15a receives sound data according to this sound signal. The sound output 15b is implemented by the instructions of the CPU 101 illustrated in FIG. 3 and by the sound input/output I/F 116 illustrated in FIG. 3, and outputs the sound signal according to the sound data to the speaker 115, and the speaker 115 outputs sound.

The capability obtainer 16, which may be implemented by the instructions of the CPU 101 illustrated in FIG. 3, obtains information indicating capability of the terminal 10. Example items indicating capability include, but not limited to, a communication capability such as a line speed of the terminal 10, and a display resolution of the display for the terminal 10.

The display control 17 is implemented by the instructions of the CPU 101 illustrated in FIG. 3 and by the display I/F 117 illustrated in FIG. 3. The display control 17 combines images of different resolutions and transmits the combined image to the display 120, as will be described later. The display control 17 also transmits information on a candidate list, received from the management system 50, to the display 120, and controls display of the candidate list on the display 120.

The delay detector 18, which is implemented by the instructions of the CPU 101 illustrated in FIG. 3, detects a delay time (ms) of image data or sound data transmitted from another terminal 10 via the relay device 30.

The data processor 19, which is implemented by the instructions of the CPU 101 illustrated in FIG. 3 and by the SSD 105 illustrated in FIG. 3, or by the instructions of the CPU 101, performs processing to store various types of data in the memory 1000 or to read various types of data stored in the memory 1000. The memory 1000 stores a terminal identification (ID) for identifying each terminal 10, a password, and the like. Further, every time image data and sound data are received in performing communication with a counterpart terminal, the memory 1000 overwrites the image data and sound data. The display 120 displays an image based on image data before being overwritten, and the speaker 115 outputs sound based on sound data before being overwritten.

Note that a terminal ID in the embodiment is an example of identification information that is used to uniquely identify a specific terminal 10, such that a language, a character(s), a symbol(s), or various marks are not limited to the above-described embodiment. For example, a combination of at least two of the above-mentioned language, character(s), symbol(s), and various marks may be used as a terminal ID.

Instead of a terminal ID, a user ID for identifying the user at the terminal 10 may be used. In such case, terminal identification information includes not only the terminal ID, but also the user ID.

<Functional Configuration of Relay Device>

The relay device 30 includes a transmitter/receiver 31, a state detector 32, a quality changer 33, and a data processor 39. These units are functions that are implemented by or that are caused to function by operating any of the hardware components illustrated in FIG. 4 in cooperation with the instructions of the CPU 201 according to the relay device control program expanded from the RD 204 to the RAM 203. The relay device 30 also includes a memory 3000 implemented by the RAM 203 illustrated in FIG. 4 and/or the HD 204 illustrated in FIG. 4.

(Service Plan Contents Management Table)

Figures 8, 9:
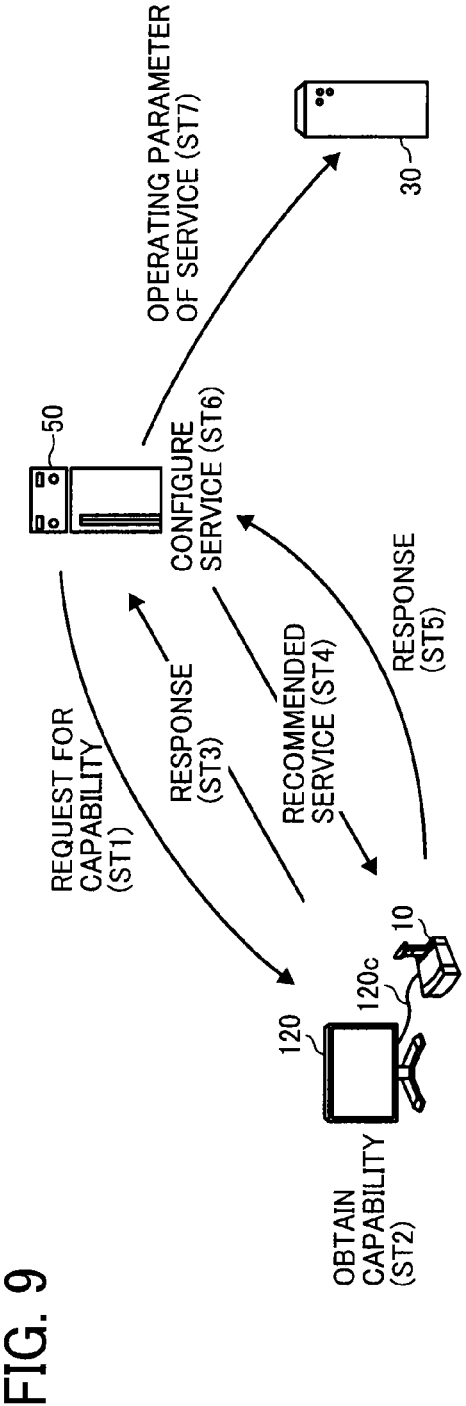
FIG. 8 is an illustration of an example data structure of a service plan contents management table.
FIG. 9 is an illustration for explaining operation of determining a service plan to be recommended, performed by the communication system of FIG. 6, according to an embodiment of the present invention.

The memory 3000 stores a service plan contents management database (service contents management DB) 3001 such as a service plan contents management table as illustrated in FIG. 8. The service plan contents management table stores, for each session to be used for communication among the plurality of terminals 10, a session ID for identifying the session, various set items for service plan, and IP addresses of the terminals 10 that are communicating through that session in association with one another. As an example of service plan set items, various operating parameters for controlling operation of the relay device 30 are stored as illustrated in FIG. 8. More specifically, such operating parameters include an image frame rate (frame per second), an image resolution, an image or sound bit rate (kilo bits per second), and an encoding format. The operating parameters used in this embodiment are those parameters that affect quality of image data and quality of sound data to be received at the terminal 10. The service plan set items may additionally or alternatively include any other information such as a sampling rate of sound, or color depth of image. The relay device 30 refers to the service plan contents management table of FIG. 8 to change, if needed, quality of content data (image data and/or sound data) received from the terminal 10, such that the content data to be transmitted to the counterpart terminal 10 has the quality parameters as defined by the service plan contents management table of FIG. 8 for a specific session. Further, in this disclosure, the set items (or set values of the set items) of a service plan and the operating parameters to be configured in providing the service plan may be used interchangeably.

(Functional Configuration of Relay Device)

Next, functional configuration of the relay device 30 will be described in detail. In the following description of functional configuration of the relay device 30, relationships of the hardware elements in FIG. 4 with the functional configuration of the relay device 30 in FIG. 6 will also be described.

The transmitter/receiver 31 of the relay device 30 illustrated in FIG. 6, which is implemented by the instructions of the CPU 201 illustrated in FIG. 4 and by the network I/F 209 illustrated in FIG. 4, transmits or receives various types of data (or information) to or from another terminal, device, or system via the communication network 2. The transmitter/receiver 31 also serves as a transferer, which transfers image data and sound data transmitted from a first communication terminal 10 to a second communication terminal 10.

The state detector 32, which is implemented by the instructions of the CPU 201 illustrated in FIG. 4, detects the operating state of the relay device 30 provided with the state detector 32. The possible operating states are "online", "offline", "communicating", and "interrupted".

The quality changer 33, which is implemented by the instructions of the CPU 201 illustrated in FIG. 4, refers to a service plan ID in the service plan contents management table (see FIG. 8), and changes the quality of image data and the quality of sound data according to an image quality parameter and a sound quality parameter.

The data processor 39, which may be implemented by the instructions of the CPU 201 illustrated in FIG. 4 and the HDD 205 illustrated in FIG. 4, performs processing to store various types of data in the memory 3000 or read various types of data stored in the memory 3000.

<Functional Configuration of Management System>

The management system 50 includes a transmitter/receiver 51, a terminal authenticator 52, a state manager 53, a terminal extractor 54, a terminal state obtainer 55, a selector 56, a session manager 57, a configuration unit 58, and a data processor 59. These units are functions that are implemented by or that are caused to function by operating any of the elements illustrated in FIG. 4 in cooperation with the instructions of the CPU 201 according to the management system program expanded from the HD 204 to the RAM 203. The management system 50 further includes a memory 5000, which is implemented by the HD 204 of FIG. 4.

(Relay Device Management Table)

The memory 5000 stores a relay device management DB 5001 such as a relay device management table illustrated in FIG. 10. The relay device management table stores, for each one of the relay devices 30 managed by the management system 50, the relay device ID, the operating state of the relay device 30, the date/time received at which state information indicating the operating state is received at the management system 50, the IP address of the relay device 30, and the maximum data transfer rate (Mbps) of the relay device 30, in association with one another. For example, the relay device management table illustrated in FIG. 10 indicates that the relay device 30a with the relay device ID "111a" has the operating state "online", the date/time received at which state information is received by the management system 50 "Apr. 10, 2014, 13:00", the IP address "1.2.1.2", and the maximum data transfer rate "100 Mbps".

(Authentication Management Table)

The memory 5000 further stores an authentication management DB 5002 such as an authentication management table illustrated in FIG. 11. In the authentication management table, for each one of the terminals 10 managed by the management system 50, the terminal ID and the password are stored in association with each other. For example, the authentication management table illustrated in FIG. 11 indicates that the terminal ID of the terminal 10aa is "01aa", and the password of the terminal 10aa is "aaaa".

(Terminal Management Table)

The memory 5000 also stores a terminal management DB 5003 such as a terminal management table illustrated in FIG. 12. The terminal management table stores, for each one of the terminals 10 managed by the management system 50, the terminal ID of the terminal 10, a counterpart terminal name in the case where the terminal 10 serves as a counterpart terminal, the operating state of the terminal 10, a date/time received at which login request information described later is received at the management system 50, the IP address of the terminal 10, and the service plan ID of the service to be provided to the terminal 10, in association with one another. For example, the terminal management table illustrated in FIG. 12 indicates that the terminal 10aa with the terminal ID "01aa" has the counterpart terminal name "AA terminal, Tokyo office, Japan", the operating state "online (communication OK)", the date/time received at which login request information is received by the management system 50 "Apr. 10, 2014, 13:40", the IP address "1.2.1.3", and the service plan with the service plan ID "svp103" is provided.

(Candidate List Management Table)

The memory 5000 further stores a candidate list management DB 5004 such as a candidate list management table illustrated in FIG. 13. The candidate list management table stores, for each one of the terminals 10 managed by the management system 50, the terminal ID of the terminal 10 (starting terminal) that requests to start communication, in association with the terminal IDs of all counterpart terminals 10 registered as candidate counterpart terminals for the starting terminal 10. For example, the candidate list management table illustrated in FIG. 13 indicates that candidates for a counterpart terminal to which a starting terminal (terminal 10aa) whose terminal ID is "01aa" can send a request to start communication in a videoconference are the terminal 10ab whose terminal ID is "01ab", the terminal 10ba whose terminal ID is "01ba", the terminal 10bb whose terminal ID is "01bb", and so forth. The candidate counterpart terminals are updated by addition or deletion in response to an addition or deletion request received from an arbitrary terminal to the management system 50.

(Session Management Table)

The memory 5000 also stores a session management DB 5005 such as a session management table illustrated in FIG. 14. The session management table stores, for each session ID of a session to be used for communication, the relay device ID of a relay device 30 used in relaying image data and sound data, the terminal ID of a starting terminal, the terminal ID of a counterpart terminal, a delay time (ms) in receiving image data at the counterpart terminal, and a received date/time at which delay information indicating this delay time is transmitted from the counterpart terminal and received by the management system 50 in association with one another. The session ID in the session management table is the same as the session ID in the service plan contents management table of FIG. 8. For example, referring to FIG. 14, through the session with the session ID "se1", two terminals (10aa, 10db) are communicated with each other via the relay device 30d with the device ID "111d".

(Capability Management Table)

The memory 5000 further stores a capability management DB 5006, such as a capability management table illustrated in FIG. 15. The capability management table stores, for each one of one or more capability items to be obtained from the terminal 10 in determining a service plan, a capability ID for identifying the capability item and a capability name indicating the capability item. The capability items to be obtained from the terminal 10 may be previously determined based on set items for service plan being managed using the service plan management table of FIG. 18. For example, the capability management table stores the capability item with the capability ID "m001" and the capability name "line speed", and the capability item with the capability ID "m002" and the capability name "display resolution". The capability item "line speed" may be used to determine at least a set value for the set item "frame rate". The capability item "display resolution" may be used to determine at least a set value for the set item "resolution". While the capability management table may store any other capability items related to the set items for service plan, it is assumed that the capability items "line speed" and "display resolution" are considered in this example for simplicity. Further, as described in the following, the capability item "line speed" may be used to also determine a set value for the set item "resolution". That is, one capability item may be used to determine more than one set item of service plan.

(Preferential Rating Management Table)

The memory 5000 further stores a preferential rating management DB 5007, which stores a preferential rating management table for the capability item being managed by the capability management DB 5006. In this example, the memory 5000 stores a preferential rating management table for line speed as illustrated in FIG. 16A, and a preferential rating management table for display resolution as illustrated in FIG. 16B. FIG. 16A is an illustration of an example data structure of the preferential rating management table for line speed. FIG. 16B is an illustration of an example data structure of the preferential rating management table for display resolution.

The preferential rating management table previously stores a preferential rating to be used for determining a service plan to be recommended to the terminal 10, for a set value ID for identifying a specific set value of the service plan and for a capability level of the terminal 10. In this example, the preferential rating is represented by a number of points. For example, the preferential rating management table for line speed of FIG. 16A previously sets preferential rating indicating priority in selecting each one of set value IDs of at least the set items "frame rate" and "display resolution", for each capability level of the capability item "line speed". The preferential rating management table for display resolution of FIG. 16B previously sets preferential rating indicating priority in selecting each one of the set value IDs of at least the set item "resolution", for each capability level of the capability item "display resolution".

(Set Value Management Table)

The memory 5000 further stores a set value management DB 5008, which stores a set value management table for set item of service plan as managed by the service plan management table of FIG. 18. In this example, the memory 5000 stores a set value management table for frame rate as illustrated in FIG. 17A, and a set value management table for display resolution as illustrated in FIG. 17B. Further, the management system 50 manages the set value IDs to be equal to with each other between the preferential rating management table in FIG. 16 and the set value management table of FIG. 17, or among any other management tables being managed by the management system 50. FIG. 17A is an illustration of an example data structure of a set value management table for frame rate. FIG. 17B is an illustration of an example data structure of a set value management table for display resolution.

The set value management table for frame rate of FIG. 17A stores a plurality of set values for frame rate (with the service ID "sv100"), which is to be used for determining a service plan to be provided to the terminal 10, in association with a set value ID for identifying that set value. For example, the set value "30 fps" for the set item "frame rate" is assigned with the set value ID "svc103". The set value management table for frame rate of FIG. 17B stores a plurality of set values for display resolution (with the service ID "sv200"), which is to be used for determining a service plan to be provided to the terminal 10, in association with a set value ID for identifying that set value. For example, the set value "VGA" for the set item "(display) resolution" is assigned with the set value ID "svc201".

(Service Plan Management Table)

The memory 5000 further stores a service plan management DB 5009, such as a service plan management table of FIG. 18. The service plan management table stores, for each one of service plans available for selection, a service plan ID for identifying the service plan, set values of set items for that service plan, and a usage fee for using that service plan, in association with one another. More specifically, for each set item of the service plan, a specific set value is managed. For example, the service plan with the service plan ID "svp101" has the set value "30 fps" for frame rate, "VGA" for resolution, and so on. Since these set items "frame rate", "resolution", "bit rate", and "encoding format" correspond to the service contents of the service plan that are managed in the service plan contents management table (FIG. 8), description thereof is omitted. The usage fee is an amount of fee that is charged to a user of the service with a specific service plan ID, by a service provider of the service with that service plan ID. The service provider in this example may be an administrator of the management system 50 or a user of the management system 50. The usage fee is stored in association with the service plan ID of each service. For example, the service provider may charge the user with higher usage fees, as quality of image data and sound data become higher (that is, when the service contents are high-standard). For example, for the service providing high-quality image data, such as, with higher resolution or higher frame rate, such service will be charged at higher usage fees.

Note that information regarding the contents in the service plan management table (see FIG. 18) are, for example, set items and usage fee set by the service provider at the management system 50. As described below referring to S84, the management system 50 transmits information regarding the service plan set items, obtained from the service plan management table of FIG. 18 to the relay device 30. The relay device 30 then stores the information regarding the service plan set items in the service plan contents management table of FIG. 8. In this disclosure, the set items for service plan may correspond to operating parameters to be set in providing the services according to a specific service plan.

(Functional Configuration of Management System)

Next, referring back to FIG. 6, functional configuration of the management system 50 will be described in detail. In the following description of functional configuration of the management system 50, relationships of the hardware components in FIG. 4 with functional configuration of the management system 50 in FIG. 6 is also described.

The transmitter/receiver 51, which is implemented by the instructions of the CPU 201 illustrated in FIG. 4 and by the network IN 209 illustrated in FIG. 4, and transmits or receives various types of data (or information) to or from another terminal, device, or system via the communication network 2.

The terminal authenticator 52, which is implemented by the instructions of the CPU 201 illustrated in FIG. 4, performs terminal authentication by searching the authentication management DB 5002 of the memory 5000 by using a terminal ID and a password included in login request information received via the transmitter/receiver 51 as search keys and determining whether the same pair of a terminal ID and a password is managed in the authentication management DB 5002.

The state manager 53 is implemented by the instructions of the CPU 201 illustrated in FIG. 4. In order to manage the operating state of a starting terminal that has sent a login request, the state manager 53 stores the terminal ID of the starting terminal, the operating state of the starting terminal, the date/time received at which login request information is received by the management system 50, and the IP address of the starting terminal in association with one another in the terminal management DB 5003 (see FIG. 12). In addition, in response to receiving state information sent from the terminal 10 indicating that power is to be turned off when the user turns the power switch 109 of the terminal 10 from on to off, the state manager 53 changes the operating state indicating an online state to an offline state in the terminal management DB 5003 (see FIG. 12).

The terminal extractor 54, which is implemented by the instructions of the CPU 201 illustrated in FIG. 4, searches the candidate list management DB 5004 (see FIG. 13) by using the terminal ID of a starting terminal that has sent a login request as a key, and reads the terminal ID of a candidate counterpart terminal that can communicate with the starting terminal, thereby extracting the terminal ID. The terminal extractor 54 also searches the candidate list management DB 5004 (see FIG. 13) by using the terminal ID of a starting terminal that has sent a login request as a key, and extracts the terminal ID of another starting terminal that has the terminal ID of the former-mentioned starting terminal registered as a candidate for a counterpart terminal.

The terminal state obtainer 55, which is implemented by the instructions of the CPU 201 illustrated in FIG. 4, searches the terminal management DB 5003 (see FIG. 12) by using the terminal ID of a candidate counterpart terminal, extracted by the terminal extractor 54, as a search key, and reads the operating state for each terminal ID extracted by the terminal extractor 54. Accordingly, the terminal state obtainer 55 can obtain the operating state of a candidate counterpart terminal that can communicate with a starting terminal that has sent a login request. The terminal state obtainer 55 also searches the terminal management DB 5003 by using the terminal ID extracted by the terminal extractor 54 as a search key, and obtains the operating state of a starting terminal that has sent a login request.

Figure 7:
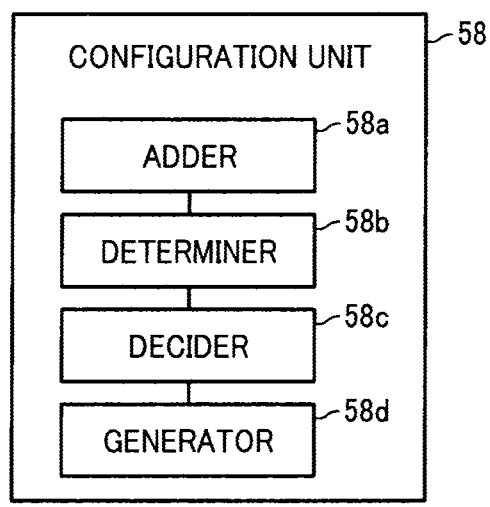
FIG. 7 is a schematic block diagram illustrating a functional configuration of a selector of the communication management system of FIG. 6.

The configuration unit 58, which is implemented by the instructions of the CPU 201 illustrated in FIG. 4, configures a service to be provided to the terminal 10 based on the capability of the terminal 10 that is obtained from the terminal 10. Specifically, the configuration unit 58 stores the service plan ID of the service plan to be provided to the terminal 10, in the "service plan ID" field of a record for that terminal 10 in the terminal management table (See FIG. 12). The configuration unit 58 includes an adder 58a, a determiner 58b, a decider 58c, and a generator 58d, which are implemented by the instructions of the CPU 201 (FIG. 4) as illustrated in FIG. 7.

The adder 58a calculates, for each one of set items for service plan, the total preferential rating by adding up the points for all set value IDs using the preferential rating management table (FIG. 16). Operation of calculating the total preferential rating is explained later.

The determiner 58b determines whether preferential rating are added for all set items.

The decider 58c decides the set value of each set item of the service plan, based on the set value ID having the highest total preferring rating. The decider 58c further decides a service plan to be recommended to the terminal 10, based on the set value decided for each set item.

Figure 26:
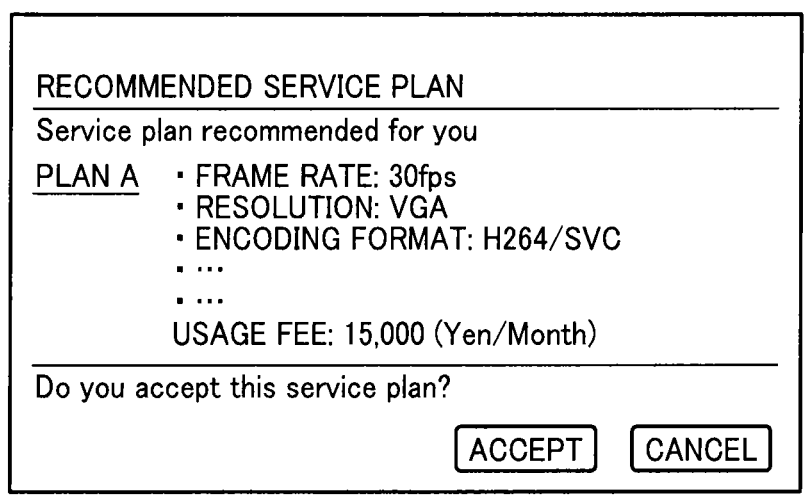
FIG. 26 is an illustration of an example screen, which asks a user to approve a recommended service plan.

The generator 58c generates a screen, such as a screen of FIG. 26, based on the set value of each set item and the usage fee for a specific service plan that is decided by the decider 58c.

<Operation>

Referring to FIG. 9, example operation of determining a service to be provided to the terminal 10 is explained according to the embodiment. FIG. 9 is a schematic diagram illustrating operation of determining a service plan to be provided to the terminal 10, performed by the communication system 1, according to an embodiment of the present invention.

As illustrated in FIG. 9, in this embodiment, the management system 50 transmits a request for capability of the terminal 10, to the terminal 10 (ST1). The terminal 10 obtains capability of the terminal 10 (ST2). The management system 50 receives the capability of the terminal 10 from the terminal 10 (ST3). The management system 50 transmits a service plan to be recommended to the terminal 10, which is determined based on the capability of the terminal 10 (ST4). In response to the recommended service plan, the management system 50 receives a response indicating whether to accept the recommended service plan from the terminal 10 (ST5). When the response indicates to accept the recommended service, the management system 50 configures the recommended service plan as a service plan for use by the terminal 10 (ST6). The management system 50 transmits information indicating operating parameters (that is, set values of the set items) of the relay device 30 for the configured service plan, to the relay device 30 (ST7).

Figure 19:
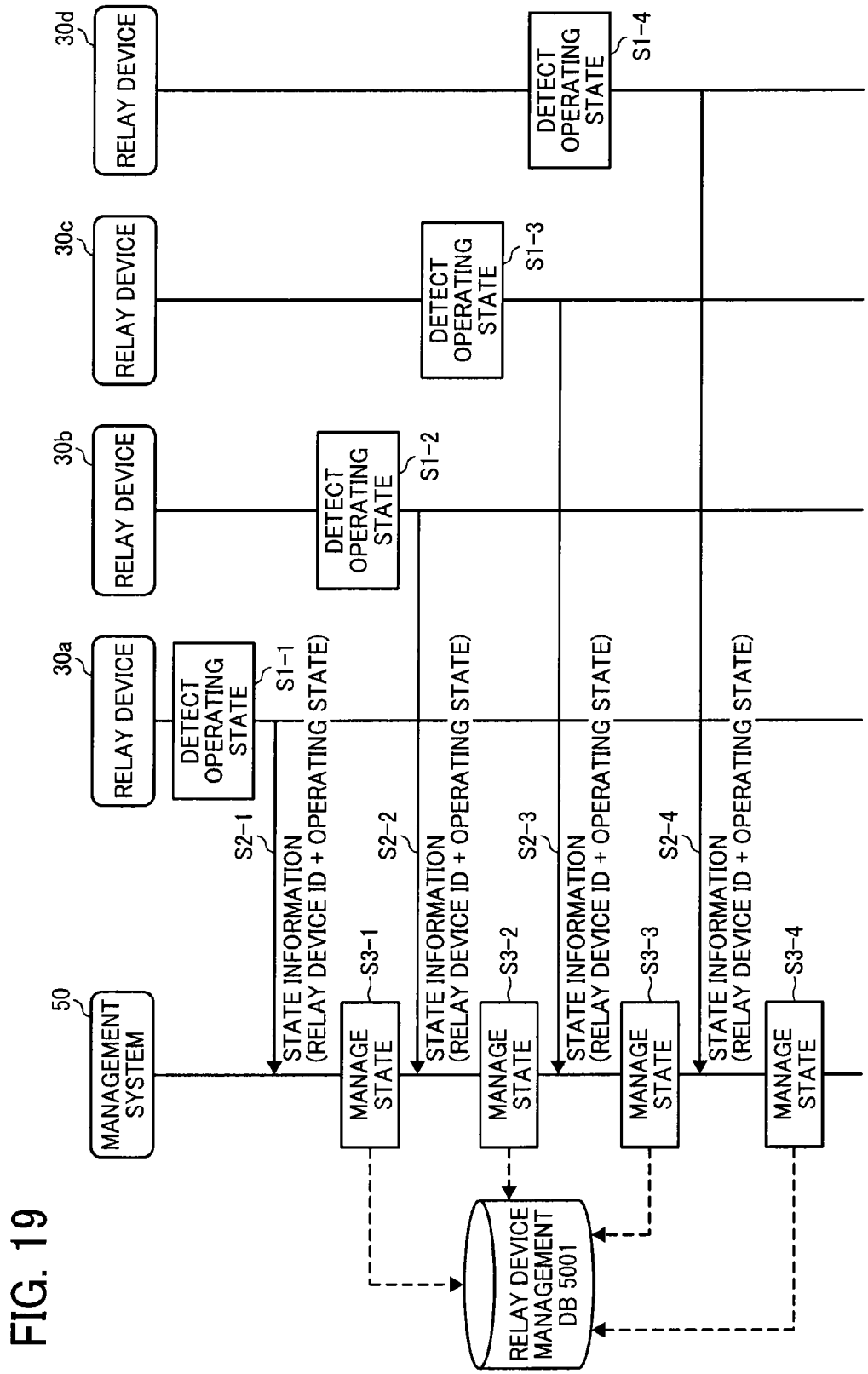
FIG. 19 is a data sequence diagram illustrating operation of managing state information indicating an operating state of a relay device, according to an embodiment of the present invention.

Referring to FIGS. 19 to 29, operation of determining a service plan and starting communication according to the service plan, performed by the communication system 1 is described according to an example embodiment of the present invention. FIG. 19 is a data sequence diagram illustrating operation of managing an operating state of each of the relay device 30, performed by the management system 50.

First, operation of managing state information, transmitted from each relay device 30 to the management system 50, indicating the state of the relay device 30 will be described using FIG. 19. At each relay device 30, the state detector 32 illustrated in FIG. 6 periodically detects the operating state of the relay device 30 (steps S1-1 to S1-4). In order to cause the management system 50 to manage the operating state of the relay device 30 in real time, the transmitter/receiver 31 of each relay device 30 periodically transmits its state information to the management system 50 via the communication network 2 (step S2-1 to S2-4). The state information includes the relay device ID of the relay device 30, and the operating state detected by the state detector 32 of the relay device 30. Note that the embodiment discusses the case where, while the relay devices (30a, 30b, and 30d) are normally operating and are "online", the relay device 30c, which is operating, is "offline" since some sort of failure has occurred in a program for executing a relay operation of the relay device 30c.

Next, in the management system 50, the transmitter/receiver 51 receives the state information transmitted from each relay device 30, and stores the state information according to each relay device ID in the relay device management DB 5001 (see FIG. 10) of the memory 5000 via the data processor 59 (steps S3-1 to S3-4). Accordingly, in the relay device management table illustrated in FIG. 10, one of the operating states "online", "offline", and "out of order" is stored and managed according to each relay device ID. In this case, for each relay device ID, the date/time received at which the state information is received by the management system 50 is additionally stored. In the case where no state information is sent from a relay device 30, an operating state field and a date/time received field in each record in the relay device management table illustrated in FIG. 10 become blank, or the previous operating state and the date/time received at which the previous operating state is received are shown.

Figure 20:
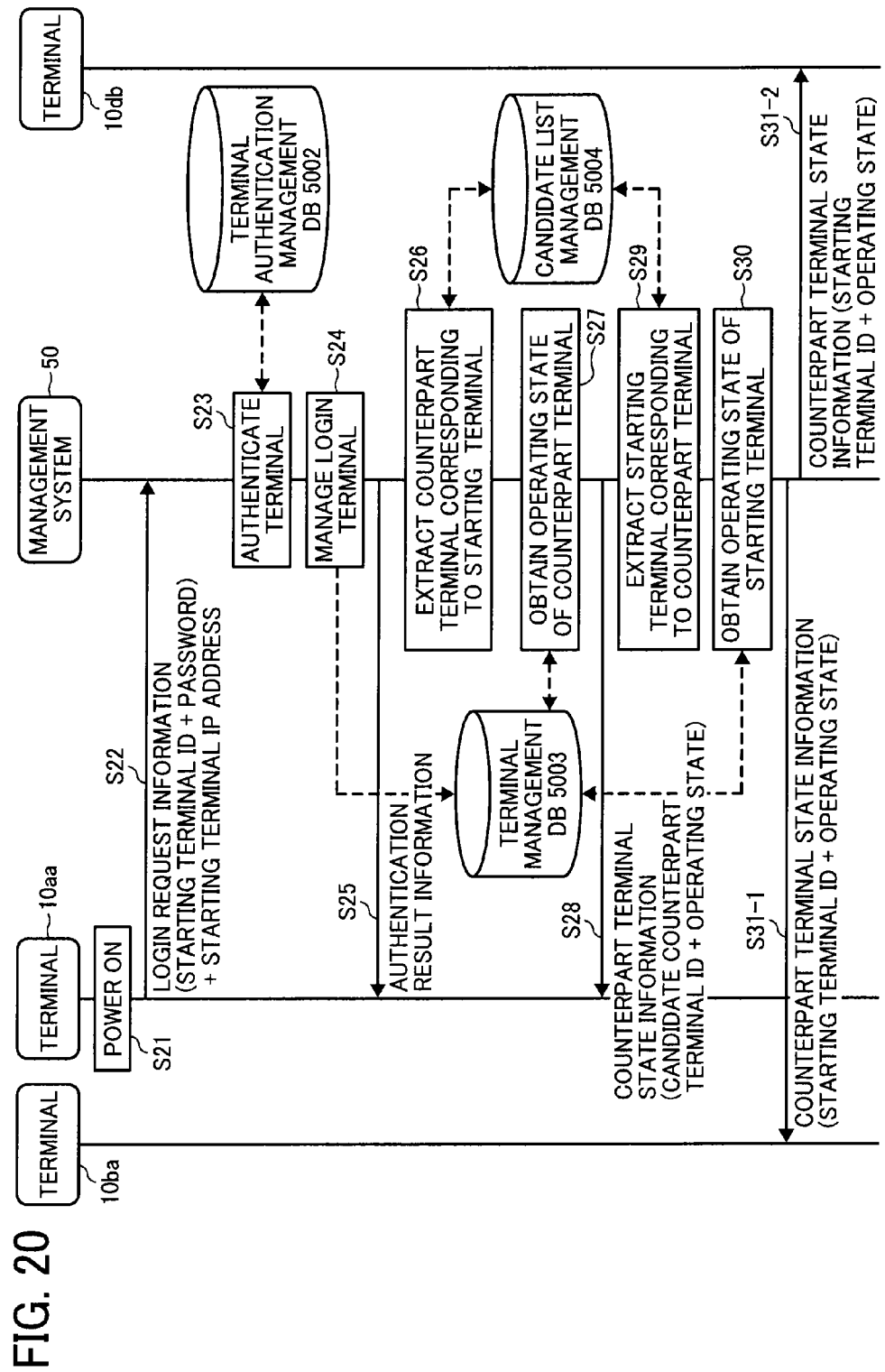
FIG. 20 is a data sequence diagram illustrating operation of preparing for starting communication between terminals, according to an embodiment of the present invention.

Next, operation of transmitting or receiving each item of management data at a preparation step before starting communication among three places, namely, the terminal 10aa, the terminal 10ba, and the terminal 10db, will be described using FIG. 20. FIG. 20 is a data sequence diagram illustrating operation for preparing to start communication between the terminals 10aa and 10ba. In FIG. 20, various management data is transmitted or received through the management data session "sei" as described above referring to FIG. 1.

When the user of a starting terminal (terminal 10aa) turns on the power switch 109 illustrated in FIG. 2, the operation input acceptor 12 illustrated in FIG. 6 accepts the power on operation and turns on the power (step S21). In response to acceptance of the power on operation, the login requester 13 automatically transmits login request information indicating a login request from the transmitter/receiver 11 to the management system 50 via the communication network 2 (step S22). Note that the login request information may be transmitted in response to operation of the operation keys 108 by the user, instead of turning on of the power switch 109. The login request information includes a terminal ID for identifying the terminal 10aa, which is a terminal serving as a starting terminal, and a password. The terminal ID and the password are data that have been read via the data processor 19 from the memory 1000 and sent to the transmitter/receiver 11. Alternatively, the terminal ID and the password may be recorded on the recording medium 1010 and may be read out from the recording medium 1010. In the case of transmitting login request information from the terminal 10aa to the management system 50, the management system 50, which is a receiving side, can detect the IP address of the terminal 10aa, which is a transmitting side.

Next, the terminal authenticator 52 of the management system 50 performs terminal authentication by searching the authentication management DB 5002 (see FIG. 11) of the memory 5000 by using the terminal ID and the password included in the login request information received via the transmitter/receiver 51 as search keys, and determining whether the same terminal ID and the same password are managed in the authentication management DB 5002 (step S23). In the case where the terminal authenticator 52 determines that the login request is a login request received from a terminal 10 that has a legitimate use authority since the same terminal ID and the same password are managed, the state manager 53 stores, in the terminal management DB 5003 (see FIG. 12), the terminal ID of the terminal 10aa, the operating state, the date/time received at which the above-described login request information is received, and the IP address of the terminal 10aa in association with one another (step S24). Accordingly, the operating state "online", the date/time received "4.10.2014.13:40", and the IP address "1.2.1.3" of the terminal 10aa are managed in association with the terminal ID "01aa" in the terminal management table illustrated in FIG. 12.

The transmitter/receiver 51 of the management system 50 transmits authentication result information indicating an authentication result obtained by the terminal authenticator 52 to the starting terminal (terminal 10aa) which has sent the above-mentioned login request, via the communication network 2 (step S25). In the embodiment, the case in which it has been determined by the terminal authenticator 52 that the terminal 10aa is a terminal that has a legitimate use authority will be described as follows.

The terminal extractor 54 of the management system 50 searches the candidate list management DB 5004 (see FIG. 13) by using the terminal ID "01aa" of the starting terminal (terminal 10aa) which has sent the login request as a search key, and reads out and thereby extracts the terminal ID of a candidate counterpart terminal that can communicate with the starting terminal (terminal 10aa) (step S26). Here, for example, the terminal IDs ("01ab", "01ba", and "01db") of counterpart terminals (terminals 10ab, 10ba, and 10db) corresponding to the terminal ID "01aa" of the starting terminal (terminal 10aa) are extracted.

Next, the terminal state obtainer 55 searches the terminal management DB 5003 (see FIG. 12) by using the terminal IDs ("01ab", "01ba", and "01db") of the counterpart terminals, which are extracted by the terminal extractor 54, as search keys, and reads corresponding operating states for the individual terminal IDs extracted by the terminal extractor 54, thereby obtaining the operating states of the terminals (10ab, 10ba, and 10db) (step S27).

Next, the transmitter/receiver 51 transmits counterpart terminal state information including the terminal IDs ("01ab", "01ba", and "01db") serving as the search keys used in step S27 described above and the operating states ("offline", "online", and "online") of the counterpart terminals (terminals 10ab, 10ba, and 10db) corresponding to these terminal IDs to the starting terminal (terminal 10aa) via the communication network 2 (step S28). In doing so, the starting terminal (terminal 10aa) can obtain the current operating states ("offline", "online", and "online") of the terminals (10*ab*, 10*ba*, and 10*db*) that are candidates for a counterpart terminal that can communicate with the starting terminal (terminal 10*aa*).

The terminal extractor 54 of the management system 50 further searches the candidate list management DB 5004 (see FIG. 13) by using the terminal ID "01aa" of the starting terminal (terminal 10*aa*) which has sent the login request as a search key, thereby extracting the terminal ID of another starting terminal that registers the terminal ID "01aa" of the above-mentioned starting terminal (terminal 10*aa*) as a candidate for a counterpart terminal (step S29). In the candidate list management table illustrated in FIG. 13, the terminal IDs of other starting terminals that are extracted are "01ab", "01ba", and "01db".

Next, the terminal state obtainer 55 of the management system 50 searches the terminal management DB 5003 (see FIG. 12) by using the terminal ID "01aa" of the starting terminal (terminal 10*aa*) which has sent the login request as a search key, and obtains the operating state of the starting terminal (terminal 10*aa*) which has sent the login request (step S30).

The transmitter/receiver 51 transmits counterpart terminal state information including the terminal ID "01aa" and the operating state "online" of the starting terminal (terminal 10*aa*), obtained at S30, to terminals (10*ba* and 10*db*) whose operating states are "online" in the terminal management DB 5003 (see FIG. 12), among the terminals (10*ab*, 10*ba*, and 10*db*) according to the terminal IDs ("01ab", "01ba", and "01db") extracted at S29 (steps S31-1 and S31-2). When transmitting the counterpart terminal state information to the terminals (10*ba* and 10*db*), the transmitter/receiver 51 refers to the IP addresses of the terminals, which are managed in the terminal management table illustrated in FIG. 12, on the basis of the terminal IDs ("01ba" and "01db"). Accordingly, the terminal ID "01aa" and the operating state "online" of the starting terminal (terminal 10*aa*) which has sent the login request can be transmitted to other counterpart terminals (terminals 10*db* and 10*ba*) that can communicate with the starting terminal (terminal 10*aa*).

For any other terminal 10, as described above referring to S21, when the user turns on the power switch 109 illustrated in FIG. 2, the operation input acceptor 12 illustrated in FIG. 6 accepts the power on operation and performs processing that is the same as or similar to the above-described S22 to S31-1 and S31-2, such that descriptions of which are omitted.

Figure 21:
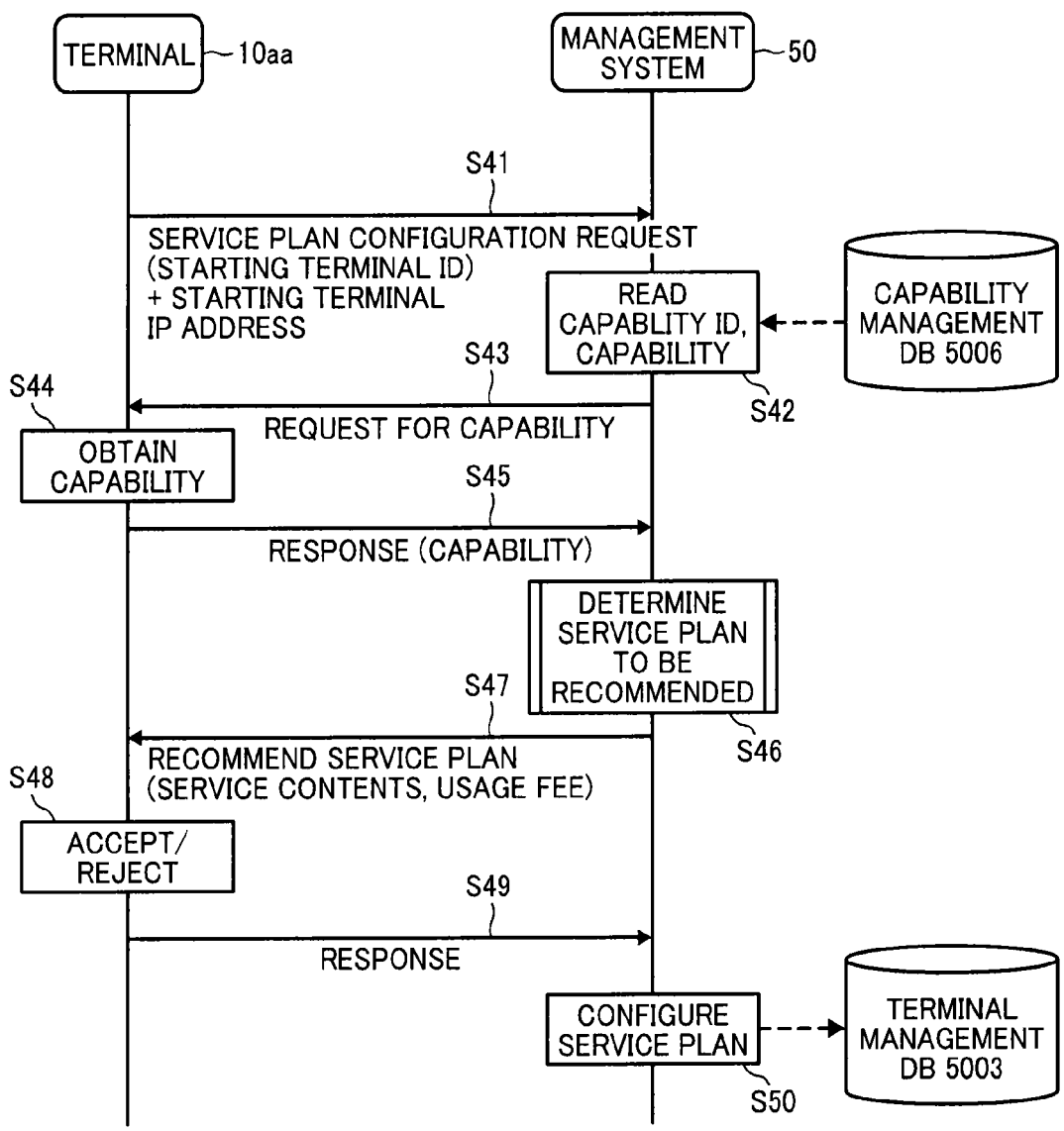
FIG. 21 is a data sequence diagram illustrating operation of configuring set values of operating parameters relating to a service plan, according to an embodiment of the present invention.

Next, referring to FIGS. 21 to 26, operation of configuring operating parameters to be used by the management system 50 in providing a service according to a service plan to the terminal 10 is explained according to an embodiment of the present invention. FIG. 21 is a data sequence diagram illustrating operation of configuring operating parameters related to a service. FIG. 22 illustrates an example screen, which allows a user to request for a recommended service plan. The example of FIG. 21 assumes that the management system 50 configures a service plan to be provided to the terminal 10*aa*.

In response to pressing of the "YES" key on the screen of FIG. 22 by the user at the terminal 10*aa*, as illustrated in FIG. 21, the transmitter/receiver 11 of the terminal 10*aa* transmits a service plan configuration request to the management system 50 (S41). The service plan configuration request includes the terminal ID of the terminal 10*aa*. Accordingly, the transmitter/receiver 51 of the management system 50 receives the service plan configuration request. The data processor 59 of the management system 50 reads out all capability items from the capability management table (FIG. 15) (S42). The transmitter/receiver 51 of the management system 50 sends a request for capability, which requests the terminal 10*aa* to obtain a capability level of each capability item, to the terminal 10*aa* (S43). This request for capability includes, for each capability item, the capability ID and the capability name. Accordingly, the transmitter/receiver 11 of the terminal 10*aa* receives the capability request including the capability ID and the capability name for each capability item.

At the terminal 10*aa*, the capability obtainer 16 obtains capability of the terminal 10*aa*, specifically, a capability level for each capability item as requested by the management system 50 (S44). For example, the capability obtainer 16 may detect a line speed, for example, by measuring a time period from the time when data is sent from the terminal 10*aa* to the time when such data is received at the terminal 10*aa*. In another example, the capability obtainer 16 may read out information indicating a resolution of the display 120 for the terminal 10*aa*, which is previously stored in a memory of the terminal 10*aa*.

The transmitter/receiver 11 of the terminal 10*aa* transmits a response indicating the capability of the terminal 10*aa* for each capability item that is requested, to the management system 50 (S45). The response includes, for each capability item, a capability level in association with the capability ID. The transmitter/receiver 51 of the management system 50 receives the response in response to the capability request. In the following, it is assumed that the requested capability items are the line speed and the display resolution of the terminal 10*aa*. Further, it is assumed that the capability levels are 1500 kbps for line speed, and VGA for display resolution.

Figure 23:
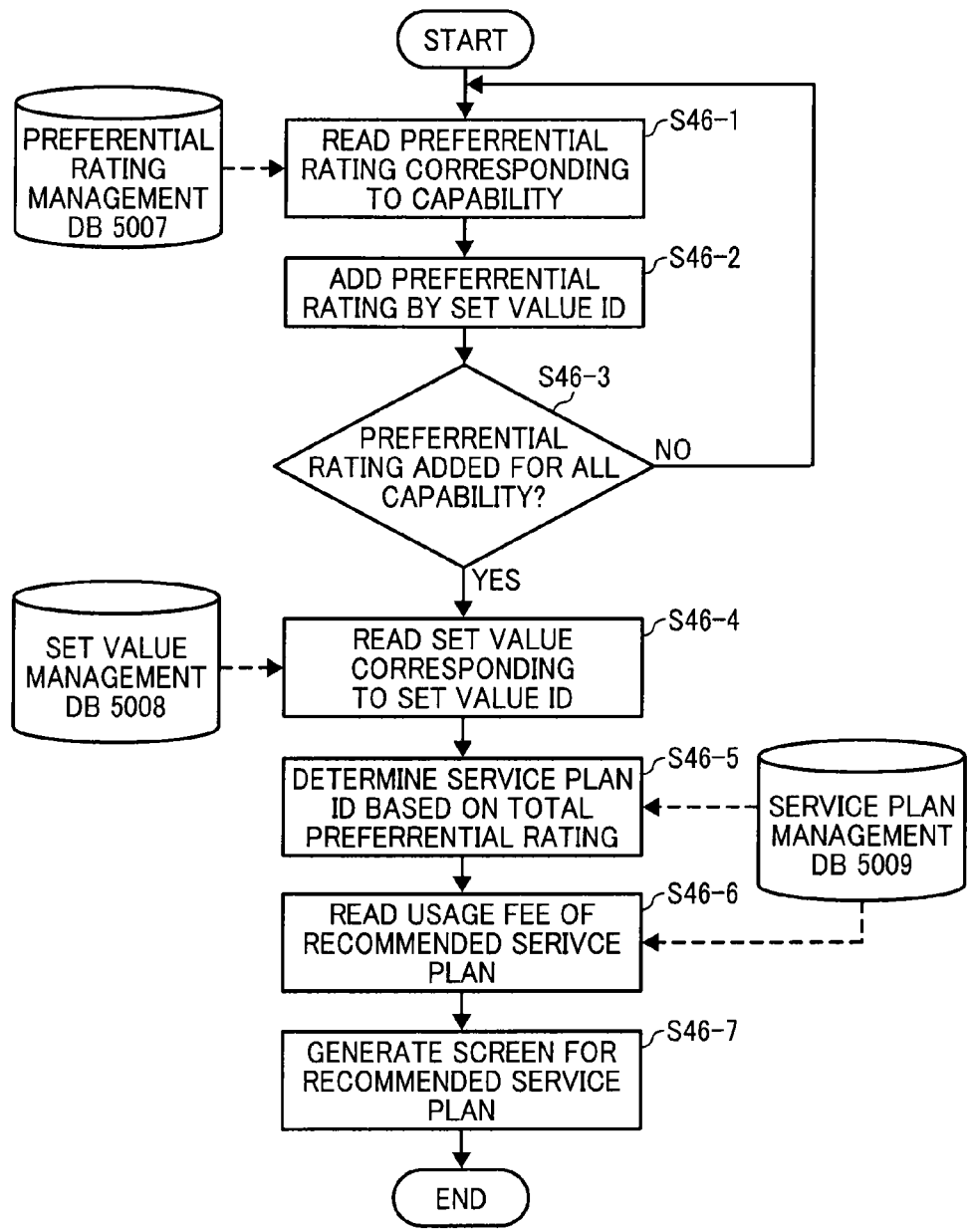
FIG. 23 is a flowchart illustrating operation of determining a service plan to be recommended, according to an embodiment of the present invention.

Next, the management system 50 performs operation of determining a service plan to be recommended to the terminal 10*aa* (S46). Referring to FIGS. 22 to 25, operation of S46 is explained in detail. FIG. 23 is a flowchart illustrating operation of determining a service plan to be recommended.

As illustrated in FIG. 23, the data processor 59 searches the preferential rating management tables (FIGS. 16A and 16B) using the capability levels for the capability items included in the response received at S45 to obtain the preferential rating (points) for each set value ID for each capability item. More specifically, for the line speed of 1500 kbps being obtained, the data processor 59 reads out preferential rating of 10 points for the set value ID "svc103", preferential rating of 5 points for the set value ID "svc203", and preferential rating of 0 point for any other set value ID. For the display resolution of VGA being obtained, the data processor 59 reads out preferential rating of 10 points for the set value ID "svc201", and preferential rating of 0 point for any other set value ID.

Next, the adder 58*a* illustrated in FIG. 7 calculates, for each one of the set value IDs, the total preferential rating by adding the preferential ratings for each set item of a service plan (S46-2). Referring to FIGS. 24 to 25, operation of calculating the total preferential rating is described. FIGS. 24A and 24B (FIG. 24) are a schematic diagram for explaining calculating total preferential rating for frame rate. FIGS. 25A to 25C (FIG. 25) are a schematic diagram for explaining calculating total preferential rating for display resolution.

As illustrated in FIG. 24A, total preferential rating is initially "0" for all set value IDs of the set item related to frame rate. As the preferential rating of 10 points is read for the set value ID "svc103" (FIG. 16A), as illustrated in FIG. 24B, the total preferential rating for the set value ID "svc103" is changed to 10 points. Similarly, as illustrated in FIG. 25A, total preferential rating is initially "0" for all set value IDs of the set item related to display resolution. As the preferential rating of 5 points is read for the set value ID "svc203" (FIG. 16A), as illustrated in FIG. 25B, the total preferential rating for the set value ID "svc203" is changed to 5 points. As the preferential rating of 10 points is read for the set value ID "svc201" (FIG. 16B), as illustrated in FIG. 25C, the total preferential rating for the set value ID "svc201" is changed to 10 points.

Next, the determiner 58b determines whether the preferential rating is added for all capability items in the received response (S46-3). When it is determined that the adder 58a has not added the preferential rating for all capability items ("NO"), the operation returns to S46-1.

At S46-3, when it is determined that the adder 58a has added the preferential rating for all capability items ("YES" at S46-3), the operation proceeds to S46-4. The decider 58c reads out, from the set value management table (FIG. 17), a set value that is associated with the set value ID having the highest preferential rating (S46-4). In this example, as illustrated in FIG. 24B, the set value ID "svc103" has the highest total preferential rating for the service with the service ID "sv100". Accordingly, the decider 58c reads out the set value "30 fps", which is associated with the set value ID "svc103" in the table of FIG. 17A, as a set value for the service plan to be recommended. As illustrated in FIG. 25C, the set value ID "svc201" has the highest total preferential rating for the service with the service ID "sv200". Accordingly, the decider 58c reads out the set value "VGA", which is associated with the set value ID "svc201" in the table of FIG. 17B, as a set value for the service plan to be recommended.

Next, the decider 58c refers to the service plan management table (FIG. 18) using the set values that are read at S46-4, to obtain a service plan ID of the service having the read set values (S46-5). In this example, the service plan ID "svp101" is selected, which indicates a service plan having the frame rate of 30 fps and the resolution of VGA. Operation of setting a set value for the other set items "bit rate" and "encoding format" is performed in a substantially similar manner as described above referring to S46-1 to S46-4 for the case of "frame rate" and "resolution".

The decider 58c further reads out a usage fee for the service plan to be recommended to the terminal 10, which is stored in association with the selected service plan ID. In this example, the usage fee of "15,000 Yen/Month" is read. The generator 58c generates a screen, such as a screen of FIG. 26, based on the set value of each set item and the usage fee for a specific service plan that is decided by the decider 58c (S46-7). FIG. 26 is an illustration of an example screen, which asks a user to approve the recommended service plan.

Referring back to FIG. 21, the transmitter/receiver 51 of the management system 50 transmits a confirmation request that requests whether to accept the recommended service plan identified with the service plan ID "svp101", to the terminal 10aa (S47). The request for approval includes data of the screen that is generated at S46-7.

Next, the user at the terminal 10aa selects whether to accept or not accept the recommended service plan, for example, based on the service contents (set items) and usage fee. In response to the user selection, the operation input acceptor 12 receives the user selection indicating whether to accept or not the recommended service plan (S48). The transmitter/receiver 11 of the management system 10aa transmits a response indicating whether to accept or not accept, to the management system 50 (S49). In the following, it is assumed that the user at the terminal 10aa selects to accept the recommended service plan.

Based on the response, the configuration unit 58 of the management system 50 stores the service plan ID of the recommended service plan, in the "service plan ID" field of a record for the terminal ID "01aa" of the terminal 10aa in the terminal management table (FIG. 12), to configure the service plan to be provided to the terminal 10aa (S50).

As described above, the management system 50 obtains information indicating capability of the terminal 10 from the terminal 10, and automatically determines a service plan that matches the obtained capability of the terminal 10 for recommendation to the user at the terminal 10.

Figure 27:
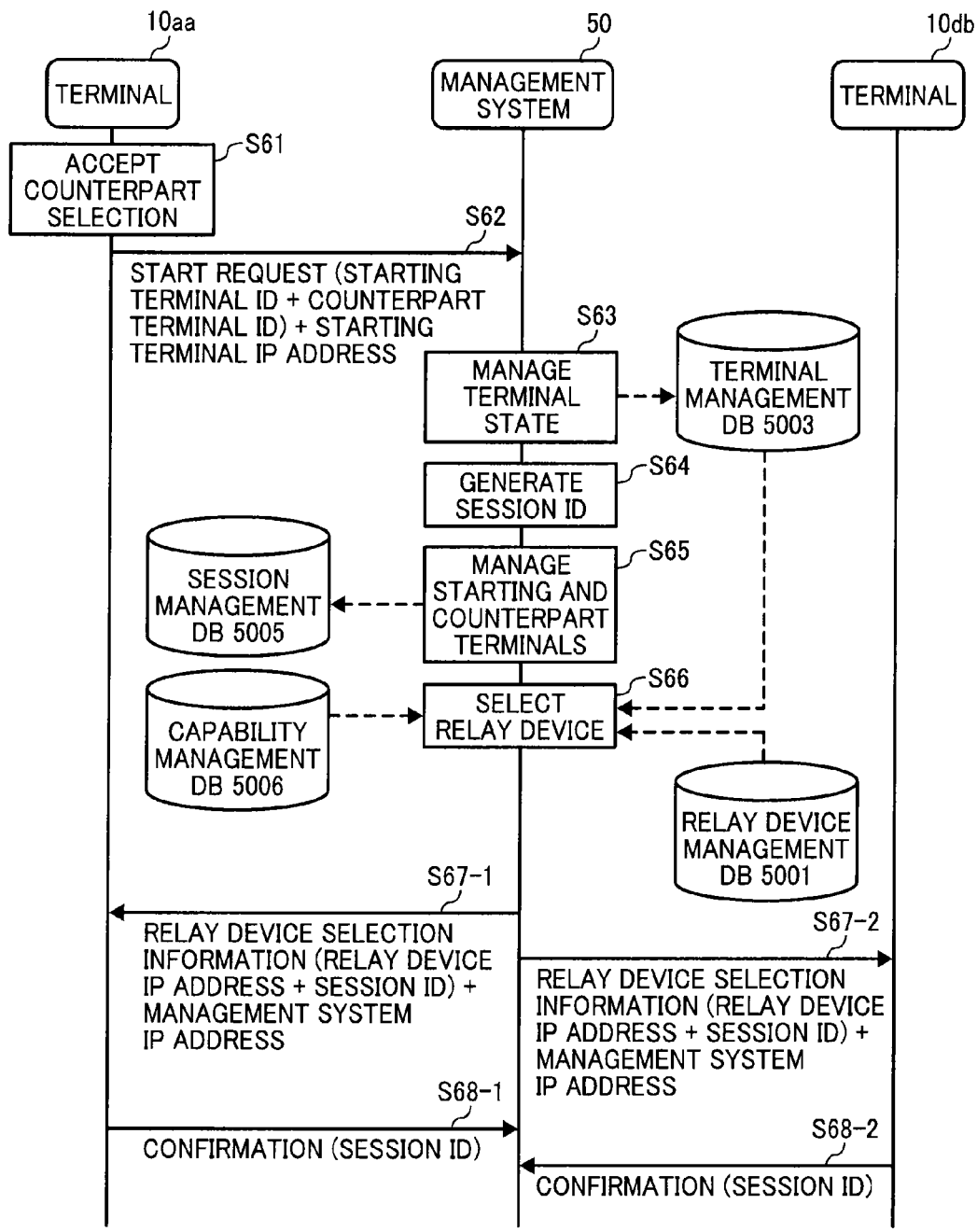
FIG. 27 is a data sequence diagram illustrating operation of selecting a relay device, according to an embodiment of the present invention.

Referring to FIG. 27, operation of selecting the relay device 30 is explained according to the embodiment. In FIG. 27, various management data is transmitted or received through the management data session "sei" as described above referring to FIG. 1. Further, in this embodiment, the starting terminal (terminal 10aa) is able to start communicating with at least one of the candidate counterpart terminals 10 having the operating state "online", based on the terminal state information received at S28 (FIG. 20). The example case in which the user at the starting terminal (terminal 10aa) starts communicating with the counterpart terminal (terminal 10db) is described below.

First, when the user presses the operation keys 108 illustrated in FIG. 2 and selects the terminal 10db, the operation input acceptor 12 illustrated in FIG. 6 accepts a request for starting communication with the counterpart terminals (terminal 10db) (step S61). The transmitter/receiver 11 of the starting terminal (terminal 10aa) transmits, to the management system 50, start request information indicating a request for starting communication (step S62). The start request information includes the terminal ID "01aa" of the terminal 10aa, and the terminal ID ("01db") of the counterpart terminal (terminal 10db). The transmitter/receiver 51 of the management system 50 obtains the start request information, and further receives the IP address of the starting terminal (terminal 10aa), which is the transmission source.

On the basis of the terminal ID "01aa" of the starting terminal (terminal 10aa) and the terminal ID ("01db") of the counterpart terminal (terminal 10db), which are included in the start request information, the state manager 53 changes the operating state field of each of records including the above-mentioned terminal IDs "01aa" and "01db" to "communicating" in the terminal management table (see FIG. 12) (S63). In this state, although the starting terminal (terminal 10aa) and the counterpart terminal (terminal 10db) have not started communicating, these terminals enter a communicating state, and, if another terminal 10 tries to communicate with the starting terminal (terminal 10aa) or the counterpart terminal (terminal 10db), a notification sound or display that indicates that the terminal is communicating is output.

Next, operation of executing a session for selecting a relay device 30 to be actually used will be described. First, the session manager 57 of the management system 50 generates a session ID used in executing a session for selecting a relay device 30 (S64). Here, the session ID "se1" is generated.

In the session management table (FIG. 14), the session manager 57 stores the session ID "se1" generated at S64, the terminal ID "01aa" of the starting terminal (terminal 10aa), and the terminal ID "01db" of the counterpart terminal (terminal 10db) in association with one another (step S65).

Next, the selector 56 of the management system 50, illustrated in FIG. 6, selects a relay device 30 for relaying communication among two sites, namely, the starting terminal (terminal 10aa) and the counterpart terminal (terminal 10db), on the basis of the relay device management table (FIG. 10) and the terminal management table (FIG. 12) (S66). Specifically, the selector 56 selects, among the relay devices having the operating state "online" in the relay device management table (FIG. 10), one relay device 30 having the IP address that is close in network location to the IP address of the starting terminal (terminal 10aa) in the terminal management table (FIG. 12). In this embodiment, it is assumed that the relay device 30aa (relay device ID "111a") is selected.

After completion of selection of the relay device 30 at S66, the transmitter/receiver 51 of the management system 50 transmits relay device selection information to the starting terminal (terminal 10aa) (S67-1). The relay device selection information includes the IP address of the relay device 30a selected at S46, and the session ID "se1" generated at S64. Accordingly, the starting terminal (terminal 10aa) can obtain the IP address of the management system 50, which is the transmission source of the relay device selection information.

Further, the transmitter/receiver 51 of the management system 50 transmits the relay device selection information to the counterpart terminal (terminal 10db) via the communication network 2 (step S67-2). The relay device selection information includes the IP address of the relay device 30a selected at S66, the terminal ID "01aa" of the starting terminal (terminal 10aa), and the session ID "se1" generated at S64. Accordingly, the counterpart terminal (terminal 10db) can obtain, in execution of a session with the session ID "se1", the IP address of the management system 50, which is the transmission source of the relay device selection information.

Next, in response to the processing at S67-1, the starting terminal (terminal 10aa) transmits, from the transmitter/receiver 11 to the management system 50 via the communication network 2, reception completion information indicating completion of reception of the relay device selection information (step S68-1). The reception completion information includes the session ID transmitted or received in the processing at S67-1. Accordingly, the management system 50 can obtain information indicating completion of transmission of the relay device selection information, executed with the session ID "se1".

Next, in response to the processing at S67-2, the counterpart terminal (terminal 10db) similarly transmits, to the management system 50, reception completion information indicating completion of reception of the relay device selection information at S67-2 (step S68-2). Also in this case, the management system 50 can obtain information indicating completion of transmission of the relay device selection information, executed with the session ID "se1".

Figure 28:
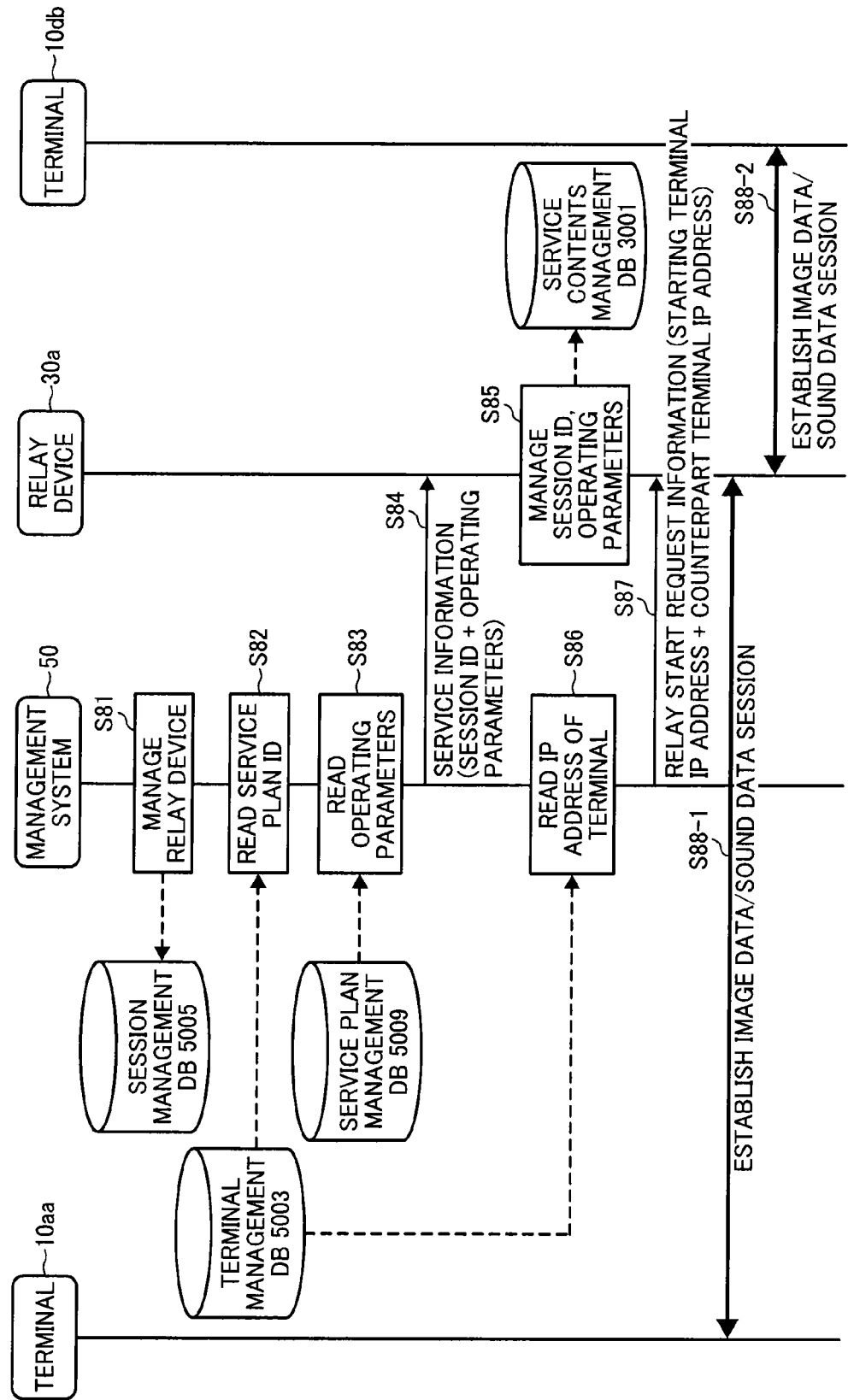
FIG. 28 is a data sequence diagram illustrating operation of establishing a communication session, according to an embodiment of the present invention.

Next, referring to FIG. 28, the session manager 57 of the management system 50 stores the relay device ID of the selected relay device 30a, in a relay device ID field of a record for the session ID "se1" in the session management table (see FIG. 14) (S81).

Next, the data processor 59 of the management system 50 searches the terminal management table (see FIG. 12) using the terminal ID of the starting terminal (terminal 10aa) received at S62 as a search key, to read the corresponding service plan ID (step S82). The data processor 59 searches the service plan management table (FIG. 18) using the service ID read at S82 as a search key to obtain the operating parameters of the service contents, that is, the set values of set items (S83).

The transmitter/receiver 51 of the management system 50 transmits service information to the above-selected relay device 30a via the communication network 2 (S84). The service information includes the session ID generated at S64 and the operating parameters (service contents) read at S83. In FIG. 28, the transmitter/receiver 51 of the management system 50 transmits the service information to the relay device 30a, and the transmitter/receiver 31 of the relay device 30a receives the service information.

Next, the data processor 39 of the relay device 30a newly stores the session ID and the operating parameters, received at S84, in association with each other in the service plan contents management table (see FIG. 8) (S85).

Next, the data processor 59 of the management system 50 searches the terminal management table (see FIG. 12) by using the terminal IDs of the starting terminal (terminal 10aa) and the counterpart terminal (terminal 10db), received at S62, as search keys, thereby reading corresponding IP addresses (S86).

The transmitter/receiver 51 of the management system 50 transmits relay start request information indicating a request for starting relaying to the above-selected relay device 30a via the communication network 2 (S87). The relay start request information includes the IP addresses read out in the above-described processing at step S65. As the transmitter/receiver 31 of the relay device 30a receives the relay start request information, the data processor 39 of the relay device 30a stores the IP addresses received at S87 in association with the session ID received at S87. Accordingly, the relay device 30a can detect that the relay device 30a has been selected. Thus, the relay device 30a establishes a session for communicating image data having three resolutions, namely, low resolution, intermediate resolution, and high resolution, and sound data between the terminals (10aa and 10db) (step S88-1 and S88-2). Thus, the terminals (10aa and 10db) can start a videoconference between two sites.

Next, using FIGS. 6 and 29, operation of transmitting or receiving image data and sound data to carry out videoconference between the starting terminal (terminal 10aa) and the counterpart terminal (terminal 10db) will be described. Since the one-way operation of transmitting image data and sound data from the terminal 10aa to the terminal 10db and the other-way operation of transmitting image data and sound data from the terminal 10db to the terminal 10aa are the same processing in terms of transmission/reception of image data and sound data and later-described delay time detection, the former-mentioned one-way communication will be described, and the latter-mentioned other-way communication will be omitted.

First, the starting terminal (terminal 10aa) transmits image data of a subject, captured by the image capturer 14, and sound data of sounds, input by the sound input 15a, from the transmitter/receiver 11 to the relay device 30a via the communication network 2 using a session identified by the session ID "se1" (the image/sound data session sed illustrated in FIG. 1) (S101).

In the relay device 30a, in response to receiving the image data and the sound data by the transmitter/receiver 31, the quality changer 33 refers to the session ID, which is stored in the service plan contents management table (see FIG. 8), to change the image data and the sound data according to the operating parameters. The operating parameters in this example includes an image quality parameter and a sound quality parameter. In this case, when the quality of the image data and the quality of the sound data transmitted from the starting terminal (terminal 10aa) are values that are less than or equal to the image quality parameter and the sound quality parameter obtained from the service plan contents management table, respectively, the quality changer 33 does not change the quality of the image data and the quality of the sound data. In contrast, when the quality of the image data transmitted from the starting terminal (terminal 10*aa*) is a value that exceeds the image quality parameter, the quality changer 33 reduces the quality of the image data to the value of the image quality parameter. Similarly, when the quality of the sound data transmitted from the starting terminal (terminal 10*aa*) is a value that exceeds the sound quality parameter, the quality changer 33 reduces the quality of the sound data to the value of the sound quality parameter.

The transmitter/receiver 31 of the relay device 30*a* transfers the image data and the sound data to the counterpart terminal (terminal 10*db*) through the image/sound data session sed (S103). Accordingly, the starting terminal (terminal 10*aa*) can transmit image data and sound data having qualities that are based on the service plan ID of the starting terminal (terminal 10*aa*). In the case of transmitting image data and sound data from the counterpart terminal (terminal 10*db*) to the starting terminal (terminal 10*aa*) via the relay device 30*a*, image data and sound data having qualities that are based on the service ID of the starting terminal (terminal 10*aa*) can be transmitted.

As described above in this embodiment, the management system 50 determines a service to be recommended to the terminal 10 based on capability of the terminal 10 obtained from the terminal 10. Accordingly, the management system 50 can automatically determine a service plan that is suitable to the use environment or application of the terminal 10, which may depend on the capability of the terminal 10. This further reduces burdens for the user to select a service plan by his or her own, as the management system 50 automatically determines the service plan based on capability of the terminal 10 operated by the user.

With acceptance by the user at the terminal 10 regarding the recommended service plan, the management system 50 configures the recommended service plan as a service plan to be provided to the terminal 10. With this configuration, the management system 50 is able to provide the service plan that is suitable to the use environment or application of the terminal 10 that may depend on the capability of the terminal 10. This further reduces burdens for the user to select a service plan by his or her own. Since the user only needs to select whether to approve or not the recommended service plan, the user is not required to have any special knowledge such as technical knowledge about the network.

In the above-described embodiments, the capability obtainer 16 obtains, for example, by measuring capability of the terminal 10 in response to the request for capability, and transmits the capability level that is measured to the management system 50. Alternatively, the capability obtainer 16 may previously store in the memory 1000 capability levels for at least capability items that may be requested by the management system 50 in determining a service plan, and reads out the capability levels of the requested capability items for transmission to the management system 50 in response to the request for capability. In the above-described embodiment, at S67, the management system 50 recommends one service that is most suitable to the capability of the terminal 10, but this is just exemplary. For example, the management system 50 may select top three set values having the highest preferential ratings for at least one set item, and select a service plan based on such selected set values for recommendation to the user. Alternatively, the management system 50 may display a list of all available service plans to the user, with the preferential rating, for example, with more than one option for set value for each set item. With such information, the user can select one of the service plans while using information regarding the preferential rating.

Figure 29:
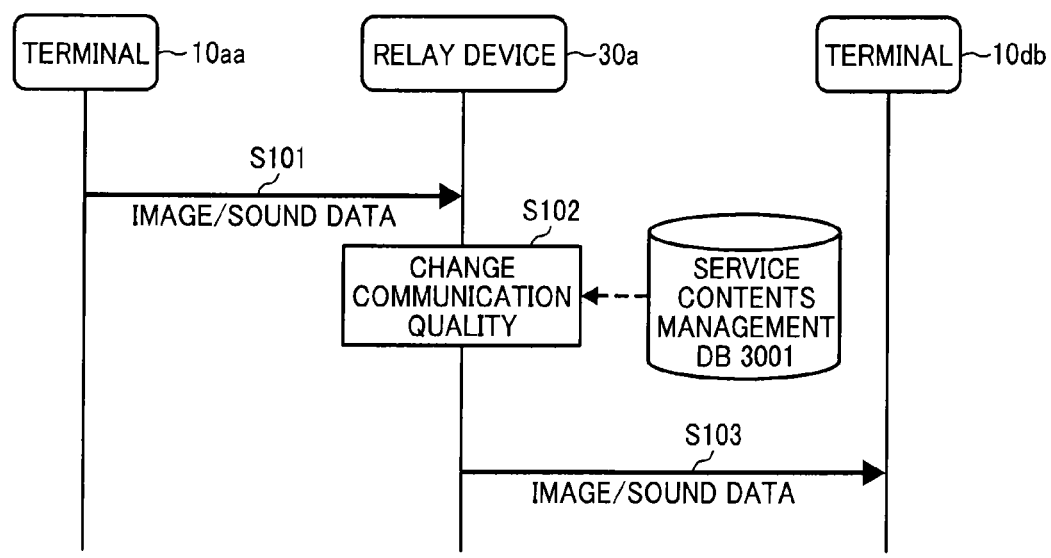
FIG. 29 is a data sequence diagram illustrating operation of transmitting or receiving image data and sound data between terminals, according to an embodiment of the present invention.

In the above-described embodiment, operation of FIG. 21 for configuring the service plan at the management system 50, and operation of FIGS. 27 to 29 for transmitting the service contents such as the operating parameters of the selected service plan to the relay device 30*a* are not consecutively performed. However, the operation may be performed in various other ways. For example, after processing at S50, the management system 50 may request the terminal 10*aa* to select a counterpart terminal 10 to start communication. Through this processing, S50 and S61 are performed consecutively. Through consecutively performing operation from responding to the management system 50 to starting communication, operability for the user at the terminal 10 may improve.

The relay devices 30 and the management system 50 in the above-described embodiment may be implemented by a single computer or a plurality of computers to which divided portions (functions) are arbitrarily allocated. In addition, any of the programs to be provided to the relay device 30, the management system 50, or the terminal 10 may be separately transmitted in units of a plurality of modules, or may be transmitted in its entirety. Alternatively, such program may be divided into a plurality of modules, and the modules may be individually transmitted from the respective computers.

In addition, a recording medium such as a CD-ROM storing the terminal program, the relay device program, or the communication management program in the above-described embodiment, and the HD 204 storing these programs are used as program products in the case of providing the terminal program, the relay device program, and the communication management program to users within a certain country or outside that country.

Although the date/time received is managed in FIGS. 10, 12, and 14, the embodiment is not limited to this, and, out of the date/time received, it is only necessary to manage at least the time received.

Further, although the IP address of each relay device 30 is managed in FIG. 10 and the IP address of each terminal 10 is managed in FIG. 12 in the above-described embodiment, the embodiment is not limited to this case, and the fully qualified domain name (FQDN) of each relay device 30 or each terminal 10 may be managed instead as long as an FQDN serves as relay device identification information for identifying each relay device 30 on the communication network 2 or terminal identification information for identifying each terminal 10 on the communication network 2. In this case, an IP address corresponding to an FQDN is obtained by a Domain Name System (DNS) server of the related art. Note that, not only "relay device identification information for identifying each relay device 30 on the communication network 2", but also "relay device connection destination information indicating a connection destination of each relay device 30 on the communication network 2", or "relay device counterpart terminal information indicating a counterpart terminal of each relay device 30 on the communication network 2" may be used. Similarly, not only "terminal identification information for identifying each terminal 10 on the communication network 2", but also "terminal connection destination information indicating a connection destination of each terminal 10 on the communication network 2", or "terminal counterpart terminal information indicating a counterpart terminal of each terminal 10 on the communication network 2" may be used.

In addition, although the case of a videoconference terminal has been described as an example of a communication terminal in the above-described embodiment, the embodiment is not limited to this case, and the communication system 1 may be a phone system such as an IP phone system or an Internet phone system. In addition, a smart phone, a mobile phone, a car navigation terminal, a wearable computer, a monitoring camera, an electronic blackboard, a projector, a game machine, or industrial equipment with a communication function may be used. A wearable computer includes a watch and a head-mounted display. Industrial equipment includes office equipment such as a multifunction peripheral (MFP) printer product, medical equipment such as an endoscope, and agricultural equipment such as a cultivator.

In addition, although image data and sound data are described as examples of content data in the above-described embodiment, the content data is not limited to these items of data, and the content data may be touch data. In this case, a feeling obtained by a user's contact at one terminal side is transmitted to the other terminal side. Further, the content data may be smell data. In this case, a smell at one terminal side is transmitted to the other terminal side. In addition, the content data may be at least one of image data, sound data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid-state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A communication management system comprising:
a transmitter configured to transmit a request for obtaining capability information indicating a capability of a first communication terminal of a plurality of communication terminals, to the first communication terminal through a network, the capability of the first communication terminal being a capability to transmit and receive content data at a predetermined resolution level or rate;
a receiver configured to receive the capability information of the first communication terminal from the first communication terminal; and
processing circuitry configured to
determine a set value for each one of a plurality of set items to be configured in providing a service plan corresponding to the capability of the first communication terminal, based on the capability information of the first communication terminal, and
after communication is initiated between the first communication terminal and a second communication terminal, and a relay device is selected to relay the communication between the first communication terminal and the second communication terminal, cause the transmitter to transmit the determined set value of each one of the plurality of set items to the relay device, as an operating parameter for controlling the relay device in transmitting or receiving content data to or from the first communication terminal according to the service plan corresponding to the capability of the first communication terminal, wherein the operating parameter controls a quality of content data to be transmitted or received by the relay device to or from the first communication terminal, such that the relay device controls the quality of content data to match the service plan corresponding to the capability of the first communication terminal.

2. The communication management system of claim 1, wherein
the transmitter transmits the request for obtaining capability information, in response to receiving a request for configuring a service plan to be provided to the first communication terminal from the first communication terminal, and
the processing circuitry determines the service plan to be provided to the first communication terminal based on the determined set value of each one of the plurality of set items.

3. The communication management system of claim 1, wherein
the request for obtaining capability information includes, for each one of a plurality of capability items requested by the communication management system, at least capability identification information identifying the capability item, and
the capability information of the first communication terminal includes a capability level obtained at the first communication terminal for each one of the plurality of capability items, and the capability identification information for each one of the plurality of capability items.

4. The communication management system of claim 3, further comprising:
a memory configured to store, for each one of a plurality of service plans available to at least one of the plurality of communication terminals, service plan identification information identifying the service plan in association with a plurality of set values of the plurality of set items to be configured in providing a service plan,
wherein the processing circuitry selects, from the plurality of service plans stored in the memory, a service plan having the determined set value of each one of the plurality of set items as the service plan to be provided to the first communication terminal.

5. The communication management system of claim 4, wherein
the memory further stores, for each one of the plurality of capability items, preferential rating information indicating a preferential rating in using a specific set value of the plurality of set items, when a specific capability level of the capability item is obtained at one of the plurality of communication terminals, and
the processing circuitry determines the set value of each one of the plurality of set items to be configured in providing the service plan corresponding to the capability of the first communication terminal, based on the preferential rating information stored in association with the capability level of each one of the capability items of the capability information that is received from the first communication terminal.

6. The communication management system of claim 5, wherein the processing circuitry further adds preferential ratings obtained using all capability levels of the capability information of the first communication terminal to calculate a total preferential rating for each one of available set values of the plurality of set items, and
selects the set value having the highest total preferential rating as the determined set value of each one of the plurality of set items to be transmitted to the relay device for the first communication terminal.

7. The communication management system of claim 3, wherein the plurality of capability items requested by the communication management system is previously determined based on the plurality of set items to be configured in providing the service plan.

8. A communication system, comprising:
the communication management system of claim 1; and
the relay device configured to relay content data between the first communication terminal and the second communication terminal according to the operating parameter that is configured based on the set value of each one of the plurality of set items that is transmitted from the communication management system.

9. A communication system, comprising:
the communication management system of claim 1; and
the first communication terminal configured to obtain a capability level indicating the capability of the first communication terminal for each one of a plurality of capability items requested by the communication management system, and transmit the capability information of the first communication terminal having the capability level for each one of the plurality of capability items to the communication management system.

10. A method of controlling communication, comprising:
transmitting a request for obtaining capability information indicating a capability of a first communication terminal of a plurality of communication terminals, to the first communication terminal through a network, the capability of the first communication terminal being a capability to transmit and receive content data at a predetermined resolution level or rate;
receiving the capability information of the first communication terminal from the first communication terminal;
determining a set value for each one of a plurality of set items to be configured in providing a service plan corresponding to the capability of the first communication terminal, based on the capability information of the first communication terminal, and
after communication is initiated between the first communication terminal and a second communication terminal, and a relay device is selected to relay the communication between the first communication terminal and the second communication terminal, transmitting the determined set value of each one of the plurality of set items to the relay device, as an operating parameter for controlling the relay device in transmitting or receiving content data to or from the first communication terminal according to the service plan corresponding to the capability of the first communication terminal, wherein the operating parameter controls a quality of content data to be transmitted or received by the relay device to or from the first communication terminal, such that the relay device controls the quality of content data to match the service plan corresponding to the capability of the first communication terminal.

11. The method of claim 10, further comprising:
storing in a memory, for each one of service plans available to at least one of the plurality of communication terminals, service plan identification information identifying the service plan in association with a plurality of set values of the plurality of set items to be configured in providing a service plan; and
selecting, from the plurality of service plans stored in the memory, a service plan having the determined set value of each one of the plurality of set items as the service plan to be provided to the first communication terminal.

12. The method of claim 11, further comprising:
storing in the memory, for each one of a plurality of capability items each indicating the capability of the communication terminal, preferential rating information indicating a preferential rating in using a specific set value of the plurality of set items, when a specific capability level of the capability item is obtained at one of the plurality of communication terminals, and
determining the set value of each one of the plurality of set items to be configured in providing the service plan corresponding to the capability of the first communication terminal, based on the preferential rating information stored in association with the capability level of each one of the capability items of the capability information that is received from the first communication terminal.

13. The method of claim 12, further comprising:

adding preferential ratings obtained using all capability levels of the capability information of the first communication terminal to calculate a total preferential rating for each one of available set values of the plurality of set items, and selecting the set value having the highest total preferential rating as the determined set value of each one of the plurality of set items to be transmitted to the relay device for the first communication terminal.

14. A non-transitory recording medium storing a program which, when executed by one or more processors, causes the one or more processors to perform a communication control method comprising:

transmitting a request for obtaining capability information indicating a capability of a first communication terminal of a plurality of communication terminals, to the first communication terminal through a network, the capability of the first communication terminal being a capability to transmit and receive content data at a predetermined resolution level or rate;

receiving the capability information of the first communication terminal from the first communication terminal;

determining a set value for each one of a plurality of set items to be configured in providing a service plan corresponding to the capability of the first communication terminal, based on the capability information of the first communication terminal, and after communication is initiated between the first communication terminal and a second communication terminal, and a relay device is selected to relay the communication between the first communication terminal and the second communication terminal, transmitting the determined set value of each one of the plurality of set items to the relay device, as an operating parameter for controlling the relay device in transmitting or receiving content data to or from the first communication terminal according to the service plan corresponding to the capability of the first communication terminal, wherein the operating parameter controls a quality of content data to be transmitted or received by the relay device to or from the first communication terminal, such that the relay device controls the quality of content data to match the service plan corresponding to the capability of the first communication terminal.

* * * * *